United States Patent
Dethier et al.

(10) Patent No.: US 10,947,960 B2
(45) Date of Patent: Mar. 16, 2021

(54) SYSTEM AND METHOD FOR THERMO-MECHANICAL MONITORING OF A SOLAR RECEIVER

(71) Applicant: COCKERILL MAINTENANCE & INGENIERIE S.A., Seraing (BE)

(72) Inventors: Alfred Dethier, Sprimont (BE); Stephane Winand, Angleur (BE)

(73) Assignee: COCKERILL MAINTENANCE & INGENIERIE S.A., Seraing (BE)

(*) Notice: Subject to any disclaimer, the term of this patent is extended or adjusted under 35 U.S.C. 154(b) by 0 days.

(21) Appl. No.: 16/492,195

(22) PCT Filed: Mar. 6, 2018

(86) PCT No.: PCT/EP2018/055436
§ 371 (c)(1),
(2) Date: Sep. 9, 2019

(87) PCT Pub. No.: WO2018/177696
PCT Pub. Date: Oct. 4, 2018

(65) Prior Publication Data
US 2020/0386211 A1     Dec. 10, 2020

(30) Foreign Application Priority Data
Mar. 29, 2017   (EP) .................................... 17163689

(51) Int. Cl.
*F03G 6/06*     (2006.01)
*F24S 40/52*    (2018.01)
(Continued)

(52) U.S. Cl.
CPC ............. *F03G 6/06* (2013.01); *F03G 6/00* (2013.01); *F24S 40/52* (2018.05); *F24S 50/40* (2018.05);
(Continued)

(58) Field of Classification Search
CPC ........ F03G 2006/008; F03G 6/00; F03G 6/06; F03G 6/064; F03G 6/065; F03G 6/067;
(Continued)

(56) References Cited

U.S. PATENT DOCUMENTS

| | | |
|---|---|---|
| 5,689,734 A | 11/1997 | Bauer et al. |
| 8,360,051 B2 | 1/2013 | Gilon et al. |

(Continued)

FOREIGN PATENT DOCUMENTS

| | | | |
|---|---|---|---|
| WO | WO 2004020926 A1 | 3/2004 | |
| WO | WO-2009152571 A1 * | 12/2009 | .............. F24S 50/00 |

(Continued)

*Primary Examiner* — Shafiq Mian
*Assistant Examiner* — Xiaoting Hu
(74) *Attorney, Agent, or Firm* — Leydig, Voit & Mayer, Ltd.

(57) ABSTRACT

A concentrated solar power (CSP) plant includes: a plurality of heliostats or a heliostat field; a substantially cylindrical solar energy receiver located atop a central tower and having an external surface covered with receiver panels and a heat shield adjacent the solar receiver, the heliostats reflecting solar energy to the external surface of the receiver, each receiver panel including a plurality of heat exchanger tubes configured to transport a heat transfer fluid, which are partly exposed on the external surface of the receiver; and a thermo-mechanical monitoring system for ensuring integrity of the solar receiver panel tubes in operation. The thermo-mechanical monitoring system includes at least: a plurality of thermal imaging devices located on ground and mounted each on a securing and orienting device, for measuring infrared radiation emitted by the external surface of the receiver and providing a panel temperature-dependent signal in an area of the external surface.

16 Claims, 15 Drawing Sheets

(51) Int. Cl.
*F24S 50/40* (2018.01)
*F24S 50/80* (2018.01)
*F24S 20/20* (2018.01)
*F24S 23/70* (2018.01)
*G01J 5/00* (2006.01)
*F03G 6/00* (2006.01)
*G01K 17/08* (2006.01)

(52) U.S. Cl.
CPC ............ *F24S 50/80* (2018.05); *G01J 5/0066* (2013.01); *G01K 17/08* (2013.01); *F03G 2006/008* (2013.01); *F24S 20/20* (2018.05); *F24S 23/70* (2018.05); *G01J 2005/0077* (2013.01)

(58) Field of Classification Search
CPC . F03G 6/068; G01J 5/10; G01J 5/0066; G01J 2005/0077; G01J 2005/0081; G01K 17/08; Y02E 10/40; Y02E 10/47; F24S 20/20; F24S 23/70; F24S 23/77; F24S 40/50; F24S 40/52; F24S 50/00; F24S 50/40; F24S 50/80; F24S 2201/00
See application file for complete search history.

(56) References Cited

U.S. PATENT DOCUMENTS

| | | | |
|---|---|---|---|
| 8,931,475 B2 | 1/2015 | Gilon et al. | |
| 9,222,702 B2 | 12/2015 | Goldberg et al. | |
| 2004/0086021 A1* | 5/2004 | Litwin | F24S 80/20 374/120 |
| 2008/0265162 A1 | 10/2008 | Hamrelius et al. | |
| 2009/0250052 A1* | 10/2009 | Gilon | F24S 50/20 126/684 |
| 2010/0006087 A1* | 1/2010 | Gilon | F24S 50/40 126/572 |
| 2013/0088604 A1 | 4/2013 | Hamrelius et al. | |
| 2013/0104963 A1 | 5/2013 | Cap et al. | |
| 2013/0139804 A1 | 6/2013 | Goldberg | |
| 2016/0025383 A1* | 1/2016 | Shinozaki | F24S 50/40 126/572 |

FOREIGN PATENT DOCUMENTS

| | | |
|---|---|---|
| WO | WO 2009152571 A1 | 12/2009 |
| WO | WO 2010017415 A2 | 2/2010 |

* cited by examiner

| | | | |
|---|---|---|---|
| INPUT | 1. Incident flux map | $\varphi_{(x,y)}$ | [W/m²] |
| | 2. Guess value - Efficiency | $\varepsilon_{(x,y)}$ | [-] |
| | 3. Salt mass flow | $\dot{M}_{salt}$ | [kg/s] |
| | 4. Solar receiver discretization - For each cell (x,y) | | |
| |    a. Absorbed power (surface $\delta_t, d_e, n_{tube,cell}$) | $\dot{Q}_{salt(x,y)}$ | [W] |
| |    b. Salt temperature | $T_{salt(x,y)}$ | [°C] |
| |    c. Salt properties at $T_{salt(x,y)}$ | $Cp, \rho, \nu, \mu, \lambda, \omega$ | |
| |    d. Inside heat transfer coefficient | $h_{i(x,y)}$ | [W/m²/K] |
| |    e. Tube discretization - For each $\alpha$ | | |
| |       i. Absorbed power (surface $\delta_t, r_e, \delta_a$) | $\dot{Q}_{salt(x,y,\alpha)}$ | [W] |
| |       ii. Internal wall temperature | $T_{i(x,y,\alpha)}$ | [°C] |
| |       iii. External wall temperature | $T_{o(x,y,\alpha)}$ | [°C] |
| |       iv. External Wall natural convection losses | $\dot{Q}_{loss,NC(x,y,\alpha)}$ | [W] |
| |       v. External Wall IR radiative losses | $\dot{Q}_{loss,rad(x,y,\alpha)}$ | [W] |
| |       vi. External Wall forced convection losses (Cell level) | $\dot{Q}_{loss,FC(x,y,\alpha)}$ | [W] |
| |    f. External wall average temperature seen by IR camera | $T_{camera(x,y)}$ | [°C] |
| |    g. Metal properties | $\lambda, \alpha, E, \nu, Rp, Rr$ | |
| |    h. Stress/strain level | $\varepsilon, \sigma$ | |
| |    i. Efficiency | $\varepsilon_{(x,y)}$ | [-] |
| | 5. External Wall forced convection losses (global) | $\dot{Q}_{loss,FC(x,y)}$ | [W] |
| OUTPUT | 6. A & B coefficients | A & B | [-] |

Table 1

FIG. 15

INPUT

1. The references temperatures on the thermal shield have to be sent by DCS to the IR Software for every RACI → 1° Correction of the camera measurement according to SAO:
2. Camera temperature map at cell level    $T_{camera\_cell(x,y)}$    [°C]

Then, IR software converts pixel temperature given by the camera to cell temperature. Therefore, the temperature of one cell is an "average" obtained from approximately 10x10 pixel temperature.

Calculate the camera temperature at cell level

Camera temperature map (input from IR Supplier) at cell level:

$$T_{camera\_cell(x,y)} = \left[ \frac{\sum_{i=1}^{10}\sum_{j=1}^{10}(T_{camera\_pixel_{(i,j)}})^4}{10 \cdot 10} \right]^{1/4}$$

3. In addition to camera temperatures CMI need to receive process information from DCS to calculate the maximum wall temperature on each cell:
   - Salt mass flow per circuit
   - Salt temperature at the inlet and the outlet of each panel
4. Guess value - Absorbed power (surface $\delta_t$, $d_e$, $n_{tube\_cell}$)    $Q_{salt(x,y)}$    [W]

Direct method

5. Solar receiver discretization - For each cell (x,y)
   a. Salt temperature    $T_{salt\_avg(x,y)}$    [°C]
   b. Salt properties at $T_{salt\_avg(x,y)}$    $Cp, \rho, \nu, \mu, \lambda, \omega$
   c. Inside heat transfer coefficient    $h_{i(x,y)}$    [W/m²/K]
   d. Tube discretization on the tube crest - For $\alpha = 90°$
      i. Maximal external wall temperature    $T_{e\_max(x,y)}$    [°C]

$$T_{e\_max(x,y)} = A \cdot T_{camera\_cell(x,y)} + B \cdot T_{salt(x,y)}$$

ii. Maximal internal wall temperature    $T_{i\_max(x,y)}$    [°C]
      iii. Absorbed power (surface $\delta_t$, $d_e$, $n_{tube\_cell}$)    $Q_{salt(x,y)}$    [W]

6. Solar receiver discretization - For each cell (x,y)
   a. Absorbed power (surface $\delta_t$, $d_e$, $n_{tube\_cell}$)    $Q_{salt(x,y)}$    [W]
   b. Salt temperature    $T_{salt(x,y)}$    [°C]
   c. Salt properties at $T_{salt(x,y)}$    $Cp, \rho, \nu, \mu, \lambda, \omega$
   d. Inside heat transfer coefficient    $h_{i(x,y)}$    [W/m²/K]
   e. Tube discretization - For each $\alpha$
      i. Absorbed power (surface $\delta_t$, $r_e$, $\delta_\alpha$)    $Q_{salt(x,y,\alpha)}$    [W]
      ii. Internal wall temperature    $T_{i(x,y,\alpha)}$    [°C]
      iii. External wall temperature    $T_{e(x,y,\alpha)}$    [°C]
   f. Metal properties    $\lambda, \alpha, E, \nu, Rp, Rr$

OUPUT

7. Stress/strain level    $\varepsilon, \sigma$
8. Comparison of the tube thermo-mechanical loading with the operating envelope
9. Power decrease rate calculation
10. Criteria and Defocusing request to the DCS

FIG. 16

SYSTEM AND METHOD FOR THERMO-MECHANICAL MONITORING OF A SOLAR RECEIVER

CROSS-REFERENCE TO PRIOR APPLICATIONS

This application is a U.S. National Phase application under 35 U.S.C. § 371 of International Application No. PCT/EP2018/055436, filed on Mar. 6, 2018, and claims benefit to European Patent Application No. EP 17163689.7, filed on Mar. 29, 2017. The International Application was published in English on Oct. 4, 2018 as WO/2018/177696 under PCT Article 21(2).

FIELD

The present invention relates to the technical field of concentrated solar power (CSP) plants or systems. In particular the invention relates to the thermo-mechanical monitoring of a molten salt solar receiver (MSSR) for CSP plants with central tower.

The solution provided by the present invention could be used in any application where thermo-mechanical monitoring is needed.

BACKGROUND

In the frame of the present invention, the external solar receiver 3 for a CSP tower plant 1 (FIG. 1) is composed of solar receiver panels 30 and of absorber panels making a thermal shield 2 and attached all around a steel structure creating an external polygon located at a certain height, for example at about 230 m in the case of the Atacama project of the applicant. In the above example, 16 solar receiver panels 30 of about 18 m high are also disposed according to a polygon arrangement having a diameter of about 20 m. A heat transfer fluid (HTF) flows through these receiver panels 30 from a cold tank 4 to a hot tank 5 according to a specific circulation with controls at different points (FIG. 2).

The solar receiver panels 30 are made of straight welded tubes 6 (FIG. 3) arranged in vertical position to facilitate draining and venting, the tubes 6 being not welded to each other along their length. These tubes 6 have a front face exposed to solar irradiation and a back face not exposed to the solar irradiation.

A supporting system is welded to the back area of the tube at different positions along the tube length. The supporting system allows horizontal and vertical expansion and prevents a bending of the tubes due to a high thermal difference between the front and back faces of each tube.

Thermal monitoring of solar receivers used in CSP tower technology is performed by IR cameras allowing the capture of a thermal image of the receiver surface as already known in other domains like manufacturing process with control and detection of localized over-heating points.

Among the patents on the manufacturing of IR cameras, the following patents can be cited:
  FLIR patent US 2008/0265162 A1 and Brightsource patent US 20130088604 A1;
  Westinghouse Electric Corporation patent U.S. Pat. No. 5,689,734 A disclosing a pressurized camera system for viewing an object located in a region of contamination (e.g., oil, water, particulate matter, or the like). The system is capable of being internally pressurized above ambient pressure, so that the contamination is prevented from entering the camera system and fouling the camera. The system includes a housing having an interior and a view port. An electronic sensor is disposed in the housing opposite the port for sensing the object and for generating an electrical output signal that travels along a conductor connected to the sensor.

Among the patents related to the use of such cameras in manufacturing processes Ircon patent WO 2004/020926 A1 can be cited, related to temperature control during metal melting.

In the solar domain, the following patents related to the heliostat control can be cited: SolarReserve (US 2013/0104963 A1), Brightsource (U.S. Pat. No. 8,360,051 B2, U.S. Pat. No. 9,222,702 B2 and US 2013/0139804 A1), eSolar (WO2010/017415 A2).

Concerning the thermal monitoring of solar receiver panels in CSP tower technology, only two relevant patents have been identified. The first one is the SolarReserve patent filed in 2004 (US 2004/0086021 A1). In this patent, the solution proposed consists in capturing a thermal image of the solar receiver thanks to IR cameras. These IR cameras are located at a distance from the solar receiver and positioned on the ground or at a specific height level. The connection of IR cameras could be a wireless connection. The second one was filed by Brightsource in 2009 (U.S. Pat. No. 8,931,475 B2). This patent is an improvement of that proposed by Solar-Reserve.

In this latter patent, Brightsource proposes a system and method for directly monitoring the energy flux of a solar receiver, comprising:
  a measurement of IR radiation achieved using one or more IR cameras. The external surface of each solar receiver tube is controlled by one pixel at minimum;
  thermocouples installed for:
    in and out fluid temperature measurement;
    tube surface temperature measurement;
  a meteorological station for weather control (temperature, wind velocity, humidity);
  a flow transmitter calibrated to send a signal to the control system;
  a control system which receives all signals, recalculates the temperature (based on the received signals), recalibrates the flow and redirects the heliostats;
  a method consisting of:
    determining energy flux distribution on the receiver based on IR cameras measurements;
    recalculating the flux distribution based on data from flow transmitter, thermocouples and meteorological station;
    generating an alarm signal in case of attaining the critical temperature; and
    focusing/defocusing heliostats according to these measurements.

Based on patent analysis, the above-mentioned Brightsource patent seems to be the most relevant and complete patent in this domain. However, the proposed solution is exclusively limited to the thermal monitoring of the solar receiver panel tubes. This solution is not capable to:
  recalculate with high accuracy the maximal temperature on each solar receiver tube;
  ensure a thermo-mechanical monitoring of the solar receiver tubes.

In summary, the prior art solutions are not satisfying as they are only limited to thermal monitoring of the solar receiver. In fact, there is no specific system and method able to provide the tube temperature and a thermomechanical deformation analysis and for further allowing safe operation condition of the solar receiver.

SUMMARY

In an embodiment, the present invention provides a concentrated solar power (CSP) plant, comprising: a plurality of heliostats or a heliostat field; a substantially cylindrical solar energy receiver located atop a central tower and having an external surface covered with receiver panels and a heat shield adjacent the solar receiver, the heliostats being configured to reflect solar energy to the external surface of the receiver, each receiver panel comprising a plurality of heat exchanger tubes configured to transport a heat transfer fluid, which are partly exposed on the external surface of the receiver; a thermo-mechanical monitoring system configured to ensure integrity of the solar receiver panel tubes in operation, the thermomechanical monitoring system comprising at least: a plurality of thermal imaging devices located on ground and mounted each on a securing and orienting device, configured to measure infrared radiation emitted by the external surface of the receiver and to provide a panel temperature-dependent signal in an area of the external surface; for each thermal imaging device, a reference area of interest RAOI located on the heat shield arranged opposite its thermal imaging device and containing one or more temperature sensors configured to measure a reference temperature corresponding to the RAOI, one or more flowmeters configured to measure a flow rate of heat-transfer fluid in the heat exchanger tubes and temperature sensors arranged respectively at inlets and outlets of the exchanger tubes, the measurements provided by the flowmeters and the temperature sensors being intended for calculating an energy balance absorbed by the heat transfer fluid in the receiver as well as mechanical strains experienced by the exchanger tubes; and a data processing system configured to calculate and/or supply respectively a maximum temperature, a temperature profile, and/or an absorbed power profile in each heat exchanger tube and theoretical mechanical strains assigned to each heat exchanger tube as a function of a temperature provided by the imaging devices, taking into account a reference temperature of the RAOI and a temperature of the heat transfer fluid at the inlets and the outlets of the tubes, in order to control if an operating point of an area located on the solar receiver is within an operating envelope in a 2D-space theoretical strain/$T_{max}$ defining predefined temperature and strain thresholds and in order to emit alerts upon exceeding predefined temperature and strain thresholds, while being outside the envelope and further to require heliostat radiation defocusing on the area, the data processing system comprising first control means configured to control IR cameras, second control means configured to control panel tube integrity in operation, and a distributed control system DCS connected to the first and second control means, to flowmeters, tube temperature sensors, and RAOI reference temperature sensors, the DCS being configured to communicate the measured reference temperature of the RAOI to the first control means, the measured flow rate and inlet/outlet temperatures of the heat transfer fluid to the first control means and/or second control means, and the DCS being configured to receive from the second control means local panel defocusing information for defocusing heliostat radiation on one or more panels, wherein the second control means configured to control panel tube integrity in operation comprise means configured to communicate with the first means and for: calculating a corrected maximum temperature on each exchanger tube by introducing a mathematical correction based on temperatures measured by the IR camera, inlet and outlet panel molten salt temperatures, and molten salt flow in the considered panel; with a dedicated mathematical creep-fatigue model, calculating theoretical strain level in the tubes; comparing a positioning of points defined by the calculated corrected maximum temperature and the calculated strain level within allowed solar receiver operating envelope; and generating an alarm and, according to the actual error level, requesting heliostat defocusing and/or shutdown, when a positioning of the calculated corrected maximum temperature and/or the calculated strain level is outside the operating envelope.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 15 shows Table 1.

FIG. 16 shows Table 2.

DETAILED DESCRIPTION

Figure 1:
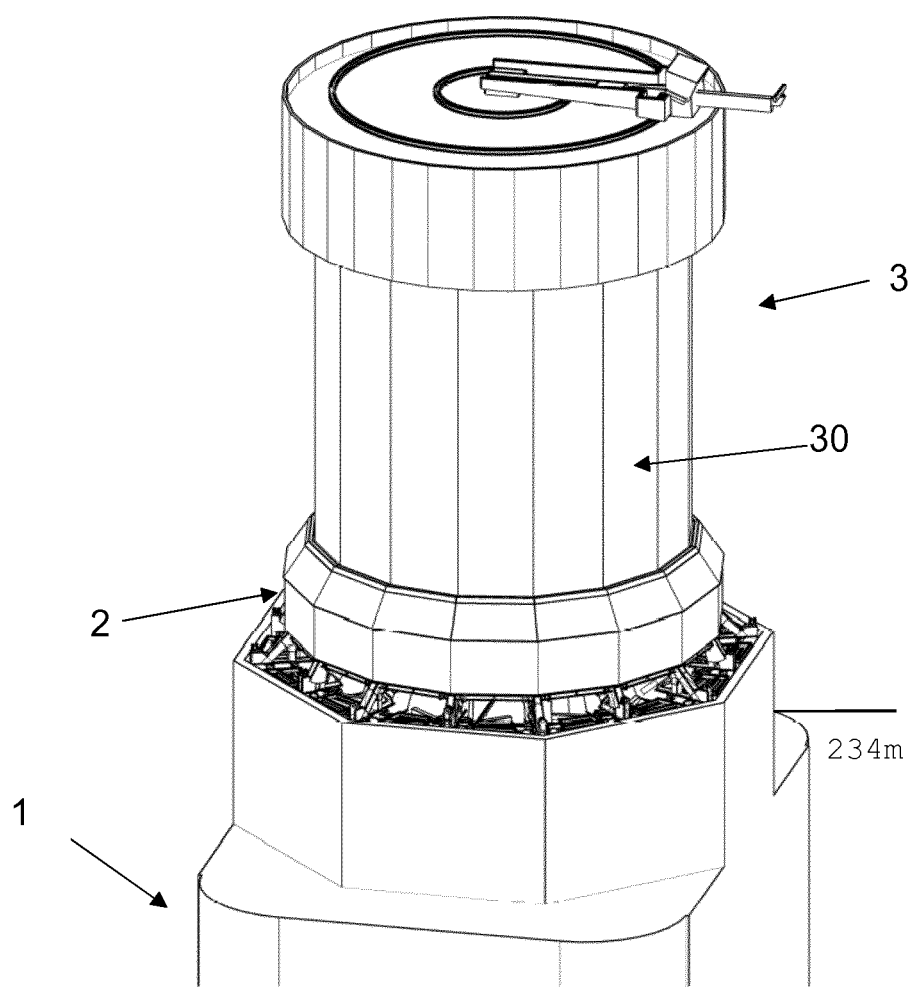
FIG. 1 is representing a CSP tower with solar receiver and thermal shield.
Figure 2:
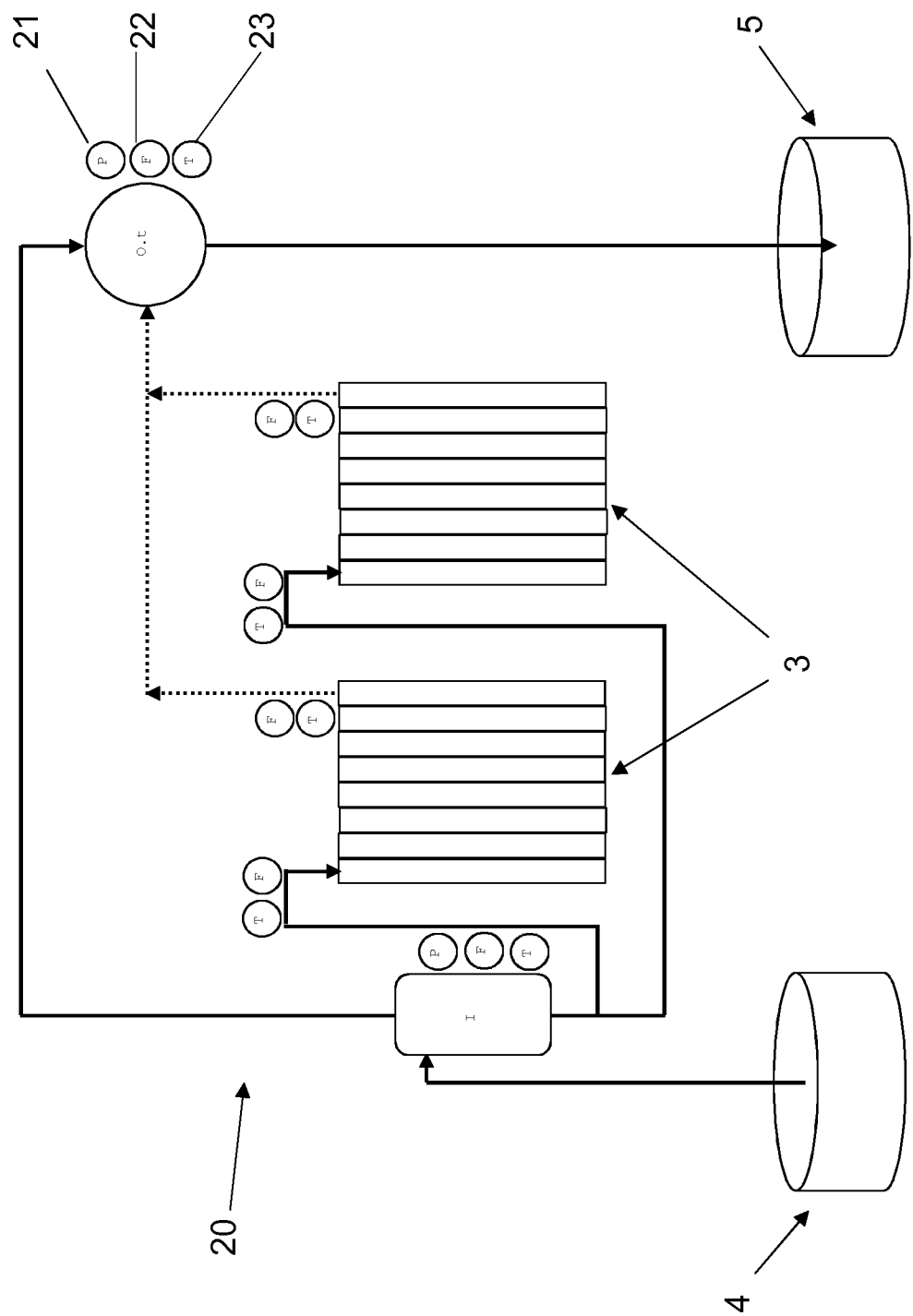
FIG. 2 is representing the molten salt cold tank and hot tank and P&ID of the solar receiver respectively.
Figure 3:
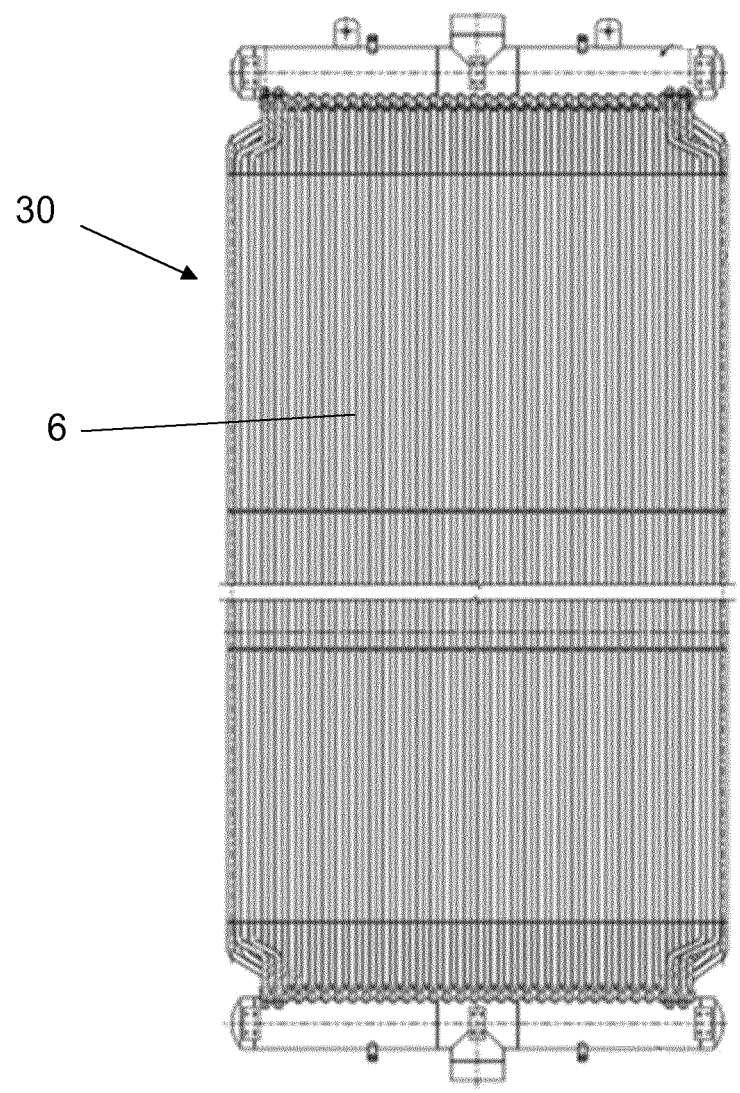
FIG. 3 is representing a design of a solar receiver panel.

In an embodiment, the present invention provides a solution for ensuring the integrity of the solar receiver panel tubes, by avoiding excessive thermo-mechanical loading on the tubes which compose the receiver surface, when receiving very high thermal flux level.

In an embodiment, the present invention achieves a thermo-mechanical monitoring which will ensure the integrity of the solar receiver panel tubes and being able to generate alarms in case of going outside an operating envelope, a maximum temperature being defined per panel, and defocusing of heliostats based on software calculation, the system acting on the heliostat field either by a local defocusing request or a total defocusing request, or being completely shut down if necessary.

In an embodiment, the present invention provides a complete scope with a simplified guarantee of the whole installation, and thus to propose a similar scope of liability as main competitors.

A first aspect of the present invention relates to a concentrated solar power (CSP) plant comprising a plurality of heliostats or heliostat field, a substantially cylindrical solar energy receiver, preferably a molten salt solar receiver (MSSR), located atop a central tower and having an external surface covered with receiver panels and a heat shield adjacent the solar receiver, the heliostats reflecting solar energy to said external surface of the receiver, each receiver panel comprising a plurality of heat exchanger tubes for transporting a heat transfer fluid, which are partly exposed on the external surface of the receiver and comprising a thermo-mechanical monitoring system to ensure the integrity of the solar receiver panel tubes in operation, said thermomechanical monitoring system comprising at least:
- a plurality of thermal imaging devices located on ground and mounted each on a securing and orienting device, for measuring infrared radiation emitted by the external surface of the receiver and providing a panel temperature-dependent signal in an area of said external surface;
- for each thermal imaging device, a reference area of interest RAOI located on the heat shield arranged opposite its thermal imaging device and containing one or more temperature sensors for measuring a reference temperature corresponding to said RAOI;
- one or more flowmeters for measuring the flow rate of heat-transfer fluid in the heat exchanger tubes and temperature sensors arranged respectively at the inlet and the outlet of the exchanger tubes, the measurements provided by the flowmeters and the temperature sensors being intended for calculating the energy balance absorbed by the heat transfer fluid in the receiver as well as the mechanical strains experienced by the exchanger tubes;
- a data processing system for calculating and/or supplying respectively the maximum temperature, temperature profile and/or absorbed power profile in each heat exchanger tube and theoretical mechanical strains assigned to each heat exchanger tube as a function of the temperature provided by the imaging devices, taking into account the reference temperature of the RAOI and the temperature of the heat transfer fluid at the inlet and the outlet of said tubes, in order to control if the operating point of an area located on the solar receiver is within an operating envelope in the 2D-space theoretical strain/$T_{max}$ defining predefined temperature and strain thresholds and in order to emit alerts in the event of exceeding said predefined temperature and strain thresholds, while being outside said envelope and further to require heliostat radiation defocusing on said area, the data processing system comprising first control means for controlling IR cameras, second control means for controlling panel tube integrity in operation and a distributed control system DCS connected to the first and second control means, to flowmeters, tube temperature sensors and RAOI reference temperature sensors, said DCS being able to communicate the measured reference temperature of the RAOI to the first control means, the measured flow rate and inlet/outlet temperatures of the heat transfer fluid to the first control means and/or second control means and said DCS being able to receive from the second control means local panel defocusing information for defocussing heliostat radiation on one or more panels;

wherein the second control means for controlling panel tube integrity in operation are means capable to communicate with the first means and for:
- calculating a corrected maximum temperature on each exchanger tube by introducing a mathematical correction based on temperatures measured by the IR camera, inlet and outlet panel molten salt temperatures and molten salt flow in the considered panel;
- with a dedicated mathematical creep-fatigue model, calculating theoretical strain level in the tubes;
- comparing the positioning of points defined by said calculated corrected maximum temperature and said calculated strain level within allowed solar receiver operating envelope;
- generating an alarm and, according to the actual error level, request heliostat defocusing and/or shutdown, when the positioning of said calculated corrected maximum temperature and/or said calculated strain level is outside said operating envelope.

According to preferred embodiments, the concentrated solar power (CSP) plant according to the invention further comprises one of the following features, or a suitable combination thereof:
- the heat transfer fluid is a molten salt;
- the thermal imaging devices are IR cameras provided with a dedicated lens, at least four in number, and located on ground at a defined distance of the CSP tower foot and with regular angular spacing from each other around the CSP tower, the angle between the area to monitor on the solar receiver and the axis of the camera lens being preferably comprised between 45° and 90°;
- for purpose of redundancy, every panel is on the field of view of two cameras, each camera being capable to monitor four panels, preferably adjacent panels and, in case of failure of a closest camera, panels being immediately outside the adjacent panels;
- the securing and orienting device, of the thermal imaging devices is composed of an thermal imaging device housing, a mast, a position adjustment system, a remote cabinet and cooling/heating means for maintaining the thermal imaging devices in a predefined range of temperature;
- the first control means for controlling IR cameras are means for:
  - detecting hotspots and releasing automatic alarms;
  - recording, analysing and storing temperature measurements;
  - providing surface temperature display for an operator, including transforming cylindrical image into rectangular flat image;
  - comparing IR camera measurements with reference temperature given by the sensors of a RAOI and based on the trend given by temperature reference, for calibrating IR cameras by adjusting transmissivity and/or emissivity parameters;
- the first control means for controlling IR cameras and second control means for controlling panel integrity in operation are under the form of readable instructions stored in a memory of a PC master, said first control means and said second control means communicating through a DLL also stored in the PC master and wherein the first control means for controlling IR cameras are also under the form of readable instructions stored in the memory of a PC slave;

raw IR camera data are post-treated on the PC master and on the PC slave and wherein post-treated data are exchanged between both PCs by the first control means, said second means treating the data of the IR cameras coming from the first means through the DLL; the maximum external wall temperature $T_{0,\,max}$ of a tube located in (x, y) is given by by equation:

$$T_{o,max_{(x,y)}} = A \cdot T_{camera,cell_{(x,y)}} + B \cdot T_{salt_{(x,y)}},$$

with A and B being obtained by a linear least squares fit on the data $T_{salt}$, $T_{0,\,max}$ and $T_{camera}$, a cell comprising i×j pixels (I, j integers >0);

the CSP plant further comprises close-loop control means for optimizing the operation of the system made of solar receiver, IR cameras and heliostat field.

A second aspect of the present invention relates to the use of the concentrated solar power (CSP) plant as described above, for optimizing the solar power received by the solar receiver and/or the used solar receiver surface.

A third aspect of the present invention relates to a method for thermo-mechanically monitoring a solar energy receiver of a concentrated solar power (CSP) plant, as described above, in order to ensure the integrity of the solar receiver panel tubes and/or to optimize the power loading of the solar receiver, comprising at least the following steps:
  acquire raw data from thermal imaging devices;
  correcting said raw data by reference temperatures of RAOI located on the thermal shield to get corrected temperatures at pixel level;
  acquiring molten salt mass flow data and molten salt temperatures at inlet and outlet of each receiver panel;
  guessing absorbed power;
  discretizing solar receiver in cells (x, y);
  at cell level, calculating the maximum external temperature on the tube crest of exchanger tubes, i.e. for a 90° angle line of view direction, according to $$T_{o,max_{(x,y)}} = A \cdot T_{camera,cell_{(x,y)}} + B \cdot T_{salt_{(x,y)}},$$

where A and B coefficients are determined by least squares method;
  calculating the cell maximum internal temperature in each exchanger tube;
  calculating the cell absorbed power, maximum external and internal temperature of each exchanger tube at any line of view angle;
  calculating theoretical strain level in the tube;
  comparing the actual tube thermo-mechanical loading with the operating strain/temperature envelope;
  if said positioning is outside said operating envelope, according predefined criteria, giving alert signal and possibly calculating power decrease rate and requesting heliostat radiation defocusing.

Regarding the high thermal loading and the high level of strain of the solar receiver tubes 6, a thermo-mechanical monitoring of the latter is very important for ensuring integrity of the solar receiver surface. An indirect measurement is the only possible solution therefor, opposite to any direct measurement (thermocouple, flux sensor, strain gauge, etc.).

A dedicated thermo-mechanical monitoring system and method are proposed in the present invention to:
  ensure the integrity of the solar receiver panel tubes, a maximum temperature being defined per panel as well as an operating envelope in the 2D-space (theoretical strain, $T_{0max}$) for the solar receiver;
  control the heliostat field:
    defocusing request in a first step;
    integrate in a control loop in the next steps.

Figure 4:
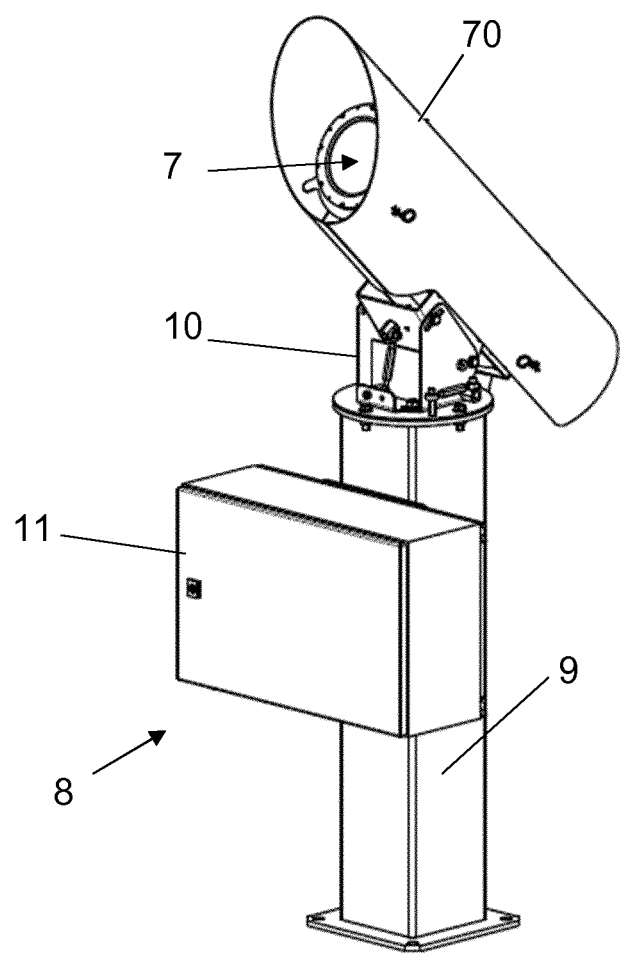
FIG. 4 is representing an IR camera with associated lens with its supporting system.
Figure 5:
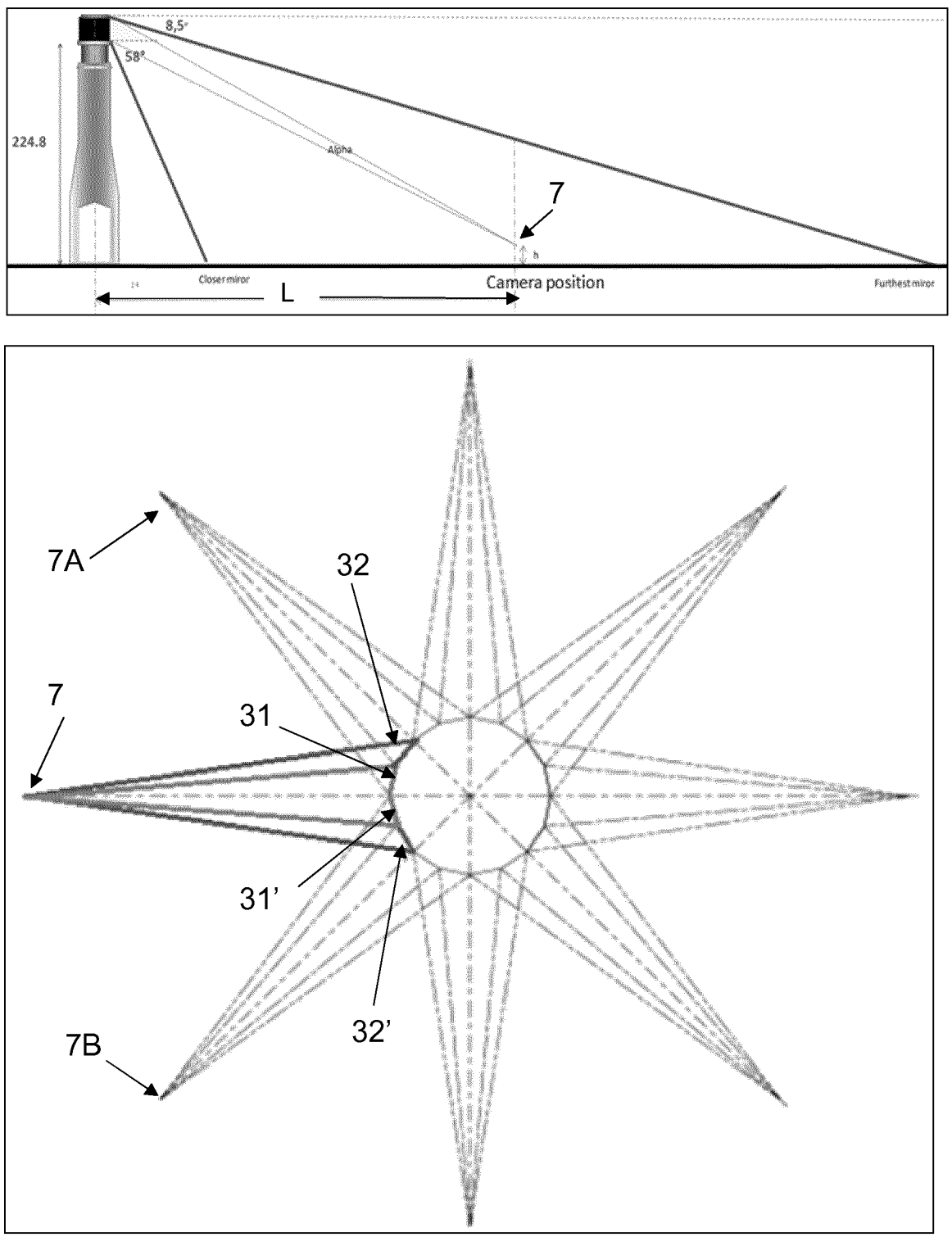
FIG. 5 is representing an example of the IR cameras ground positioning around the solar tower.

The thermo-mechanical monitoring system is based on infrared (IR) cameras 7, 7A, 7B, etc. associated with a dedicated lens installed in a specific supporting system 8 (FIG. 4). The camera set 7, 8 is located in the heliostat field, at ground level, and at a certain distance L from the foot of the tower that supports the solar receiver (FIG. 5). The above-mentioned dedicated lenses are foreseen to have a field of view adapted to the size of the solar receiver.

Figure 6:
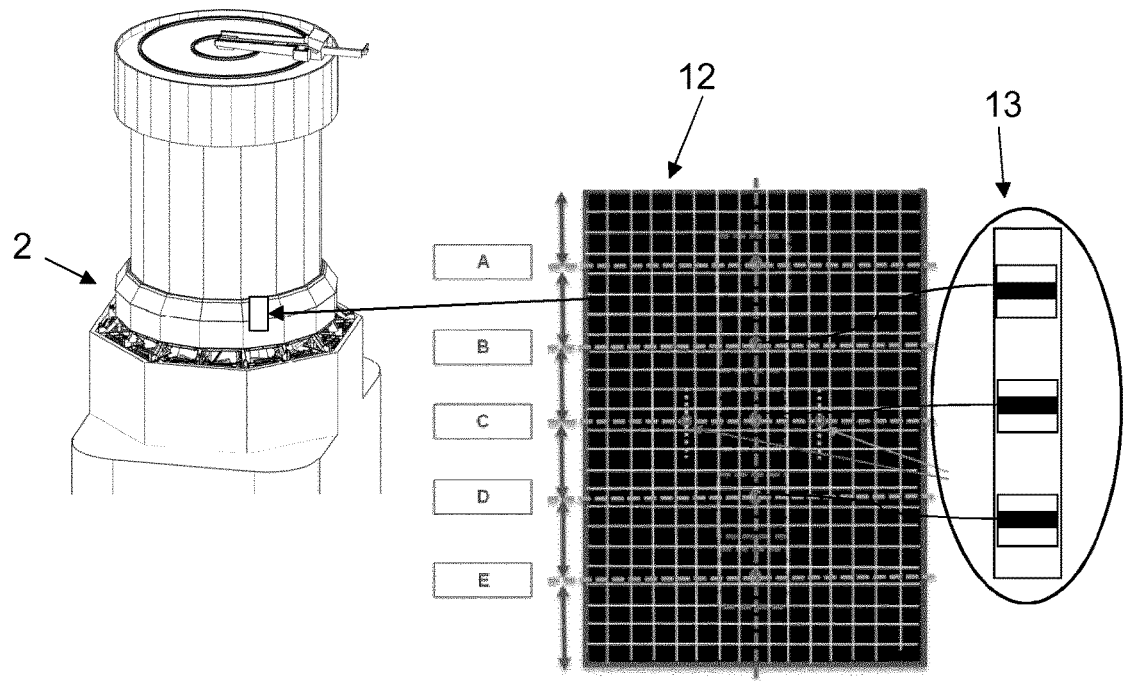
FIG. 6 represents the principles of RAOI with the location of the thermocouples.
Figure 6:
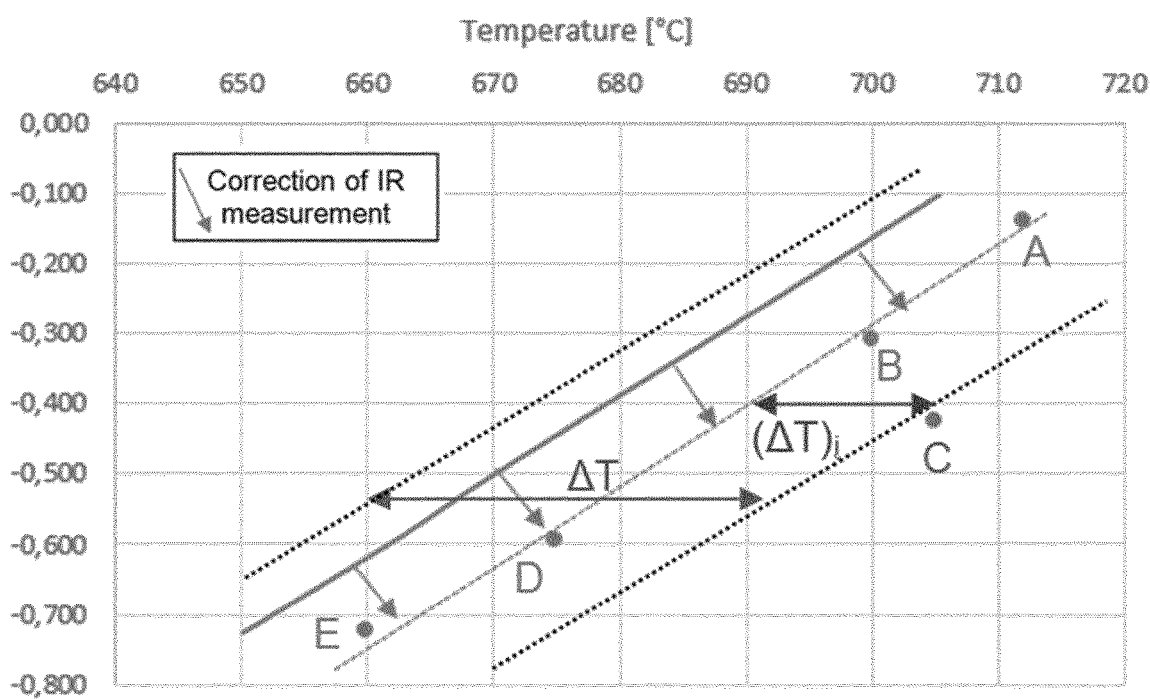

Further, a Reference Area of Interest (RAOI) 12 having temperature transmitters or thermocouples 13 (FIG. 6) is located on the solar receiver thermal shield 2, said thermocouples 13 being used for correction of the raw temperature delivered by the IR cameras. The RAOI including temperature transmitters 13 are used as a reference by the camera to take into consideration the atmospheric pollution (see below).

Figure 7:
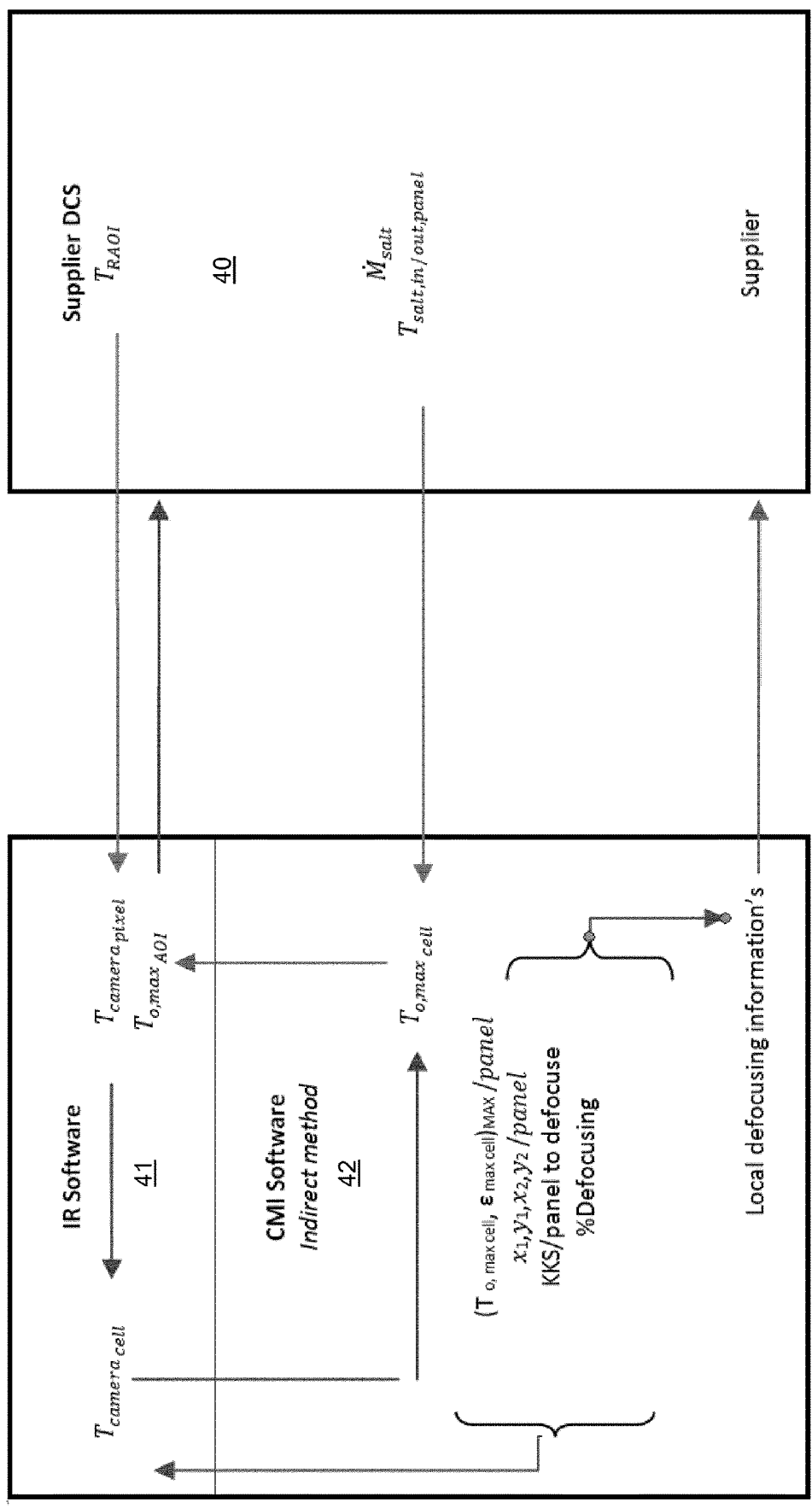
FIG. 7 represents the communication protocol between IR camera software, CMI software, and DCS.

The thermo-mechanical monitoring method is also based on so-called IR Camera Software (from IR camera supplier) and so-called CMI Software (from applicant) for data analysis and on calculation with an adapted communication protocol between these softwares, the DCS 40 (for Distributed Control System) and the monitoring system (FIG. 7).

The following listed points describe criteria example that should be taken into account to set up the main guideline for selecting the camera and associated lens, its position in the solar field, the number of cameras including the camera enclosure (e.g. to ensure a thermal protection of the camera):
  at least 4 cameras, each with an associated lens, and one spare of each, or 4 cameras as an option to ensure the system redundancy (FIG. 5, cameras 7A and 7B ensuring the redundancy for camera 7 and vice versa). In the example above, the distance between each camera and the tower foot is about 240 m;
  at least a camera resolution of 640×480 pixels;
  the covering of the exposed solar receiver surface;
  the following resolution for the camera/lens system: 1 pixel=+/−one tube diameter (e.g. 50.8 mm);
  a housing that ensures the thermal integrity of the camera (i.e. the related electronic device): −15 to 50° C. (according to information from IR camera supplier). Owing to their relatively big size, lenses deform with temperature. The supplier thus maintains the system in a temperature range of 30 to 50° C. In this temperature range, the camera system is expected to be able to correct the error induced by the lens deformation;
  an accuracy of +/−2%, this accuracy characterizing the camera itself (and not the system composed of the camera and its lens)

Description of a Preferred Embodiments of the Invention

Hardware

The proposed solution is consisting of a system and method to ensure the thermo-mechanical monitoring of a solar receiver.

According to preferred embodiments, the above system is composed of:

1. IR Cameras with Specific Lenses

Eight (8) infrared (IR) cameras, each with a dedicated lens, are located in the heliostat field at ground level and distributed approximately at every 45° of angle spacing around the tower to get a global image of the solar receiver panel surface. Every panel is in the Field Of View (FOV) of two cameras (FIG. 5) to ensure the system redundancy (e.g. panel 31: cameras 7 and 7A; panel 31': cameras 7 and 7B).

Moreover each camera monitors 4 panels, preferably the panel 31 and 31', but also 32 and 32' in case of failure of the closest camera.

This IR camera solution with dedicated lens is preferred to IR cameras with higher resolution to ensure a reasonable budget and also to ensure the adequate Field Of View (FOV) and avoid to see the sky (i.e. risk to see the sun).

The angle between the surface to monitor and the lens axis is recommended to be included between 45° and 90°, the optimum being 90° (but not possible in the current application). An angle smaller than 45° will imply that the thermal information received by the camera starts to be influenced by the "sky temperature" (reflection on the solar receiver surface) and then an accuracy degradation is foreseen.

For one pixel of the sensitive area, the IR camera gives an average of the energy emitted by the corresponding surface on the solar receiver surface and then a temperature average.

The distance between the IR camera and the solar receiver surface impacts the precision/accuracy of the measurement due to the air pollution: dust, humidity, $CO_2$, etc., which justifies the use of RAOI to correct the IR camera measurement.

2. A Dedicated System to Support and Protect the Set of IR Camera and Associated Lens As represented in FIG. 4, each camera system set 7 is associated with a support 8 allowing the fixation and orientation of the set (i.e. IR camera and lens) and a housing system which ensures the protection and the heating/cooling of the set at a predefined temperature depending on the on-site conditions. According to a preferred embodiment, the system 8 comprises a housing 70 with germanium window, said housing being made of highly polished stainless steel allowing to keep the camera and the lens in the appropriate temperature range, a position adjustment system 10, a remote cabinet 11 as well as a mast 9 in stainless steel. The main purpose of system 8 is to maintain the IR camera electric device in a range of acceptable temperature, but also to maintain the lens in a range of temperature so as the camera is able to correct the lens deformation.

3. RAOI (Reference Area of Interest)

The RAOI is a temperature reference zone for IR camera calibration installed on the thermal shield 2. A distinct RAOI zone is associated with each camera. The temperature reference is given by thermocouples, e.g. 5 thermocouples installed on each RAOI, which will provide temperature data to be compared to IR camera measurements. Calibration of IR cameras will be done by adjusting transmissivity and/or emissivity parameters. Each RAOI has to be located in front of each IR camera. Each RAOI will be similar to the tube surface in terms of material and coating. The RAOI being located on the thermal shield, it is submitted to temperature values equivalent to that of the tubes (500 to 700° C.).

4. IR Camera Software (Provided by IR Camera Supplier)

This is a specialized software for permanent infrared hotspot detection on a solar receiver with defined areas of interest (AOI fields) having, among others, the following features:

- early detection of hotspots with automatic start of measurement and data storage;
- use of reference areas of interest (RAOI) with thermocouples for IR temperature measurement correction;
- reliable automatic alarm release at defined pre- and main alarm limits, in the case a threshold is exceeded;
- automatic scaling of the live image on the operator screen;
- detection, graphical and numerical visualization and trend charts for defined areas on receiver;
- temperature trend recording and analysis;
- software adaptation: cylinder surface transformation of each camera image in rectangle form;
- software adaptation for tower movement: correction of AOI measurement points for exact positioning and definition on each tube because of movement of tower;
- definition of correction areas (shapes: rectangle, ellipse, polygon) for local correction of the emissivity value and transmission of measurement path based on a variety of correction models.

The IR camera software will:

- fit a line based on thermocouple measurements in RAOI;
- compare thermal profile given by RAOI thermocouples, and thermal profiles given by IR cameras;
- correct emissivity and/or transmissivity parameters of IR camera to bring the thermal profile given by IR camera along to the trend given by thermocouples.

5. CMI Software

This is a software developed by the applicant in view of ensuring the solar receiver integrity, and which is complementary to the software from IR camera supplier.

Owing to the resolution of the IR camera (1 pixel=21 $mm^2$) and keeping in mind that the diameter of one tube is 50.8 mm, IR camera software is not able to detect the maximum temperature on the tube temperature profile, but only an average temperature.

Figure 8:
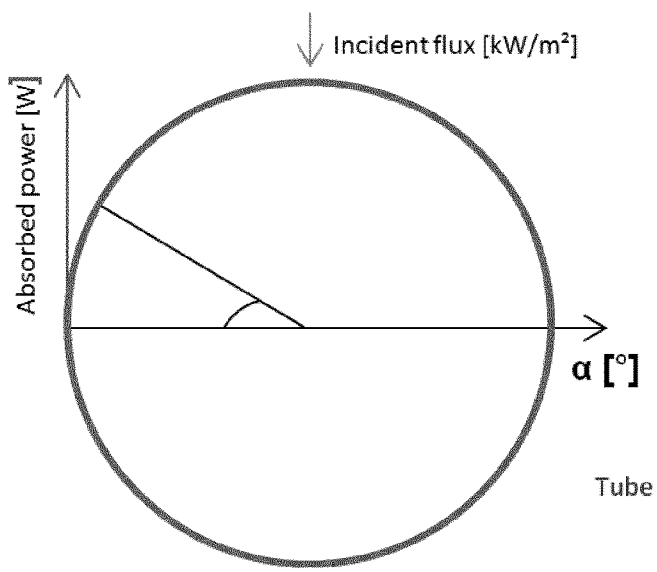
FIG. 8 represents temperature or absorbed power profile for one tube.
Figure 8:
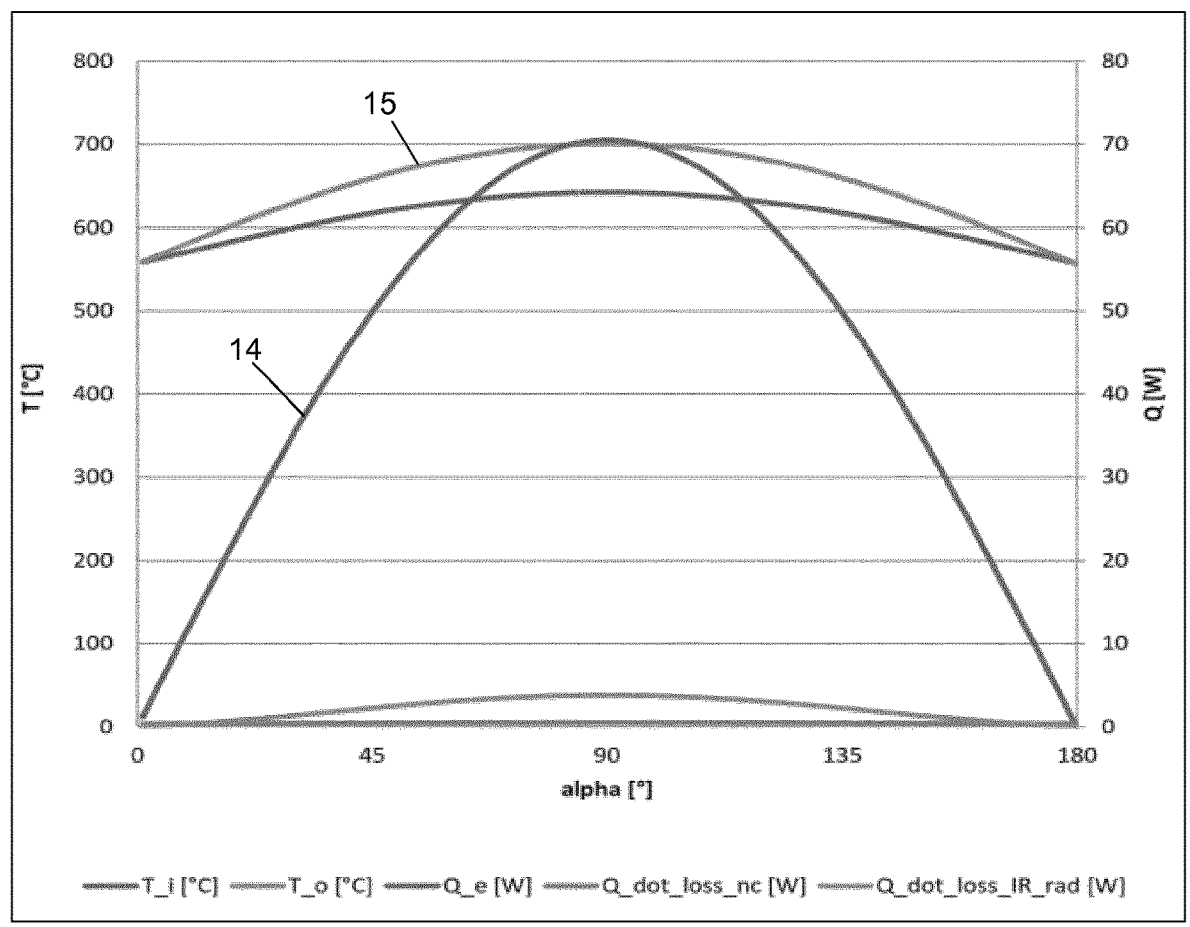

The temperature or absorbed power profile on the tube exposed to the sun rays is a sinusoidal profile 14, 15 (FIG. 8). Maximum temperature will thus be reached on a very small surface of the tube not detectable by the IR camera. Thus IR software will provide a kind of "average temperature" related to the quantity of energy emitted by the tube. This approach will lead to an under-estimation of the maximum tube temperature which is not acceptable in view of receiver integrity monitoring.

An improvement according to the present invention in that respect is to introduce a mathematical correction to calculate the maximum local temperature on the tube. This correction is based on:

- temperatures given by the IR camera (IR camera software);
- molten salts temperature at the inlet and outlet of the tube panels;
- molten salt flow in the considered panel.

Figure 9:
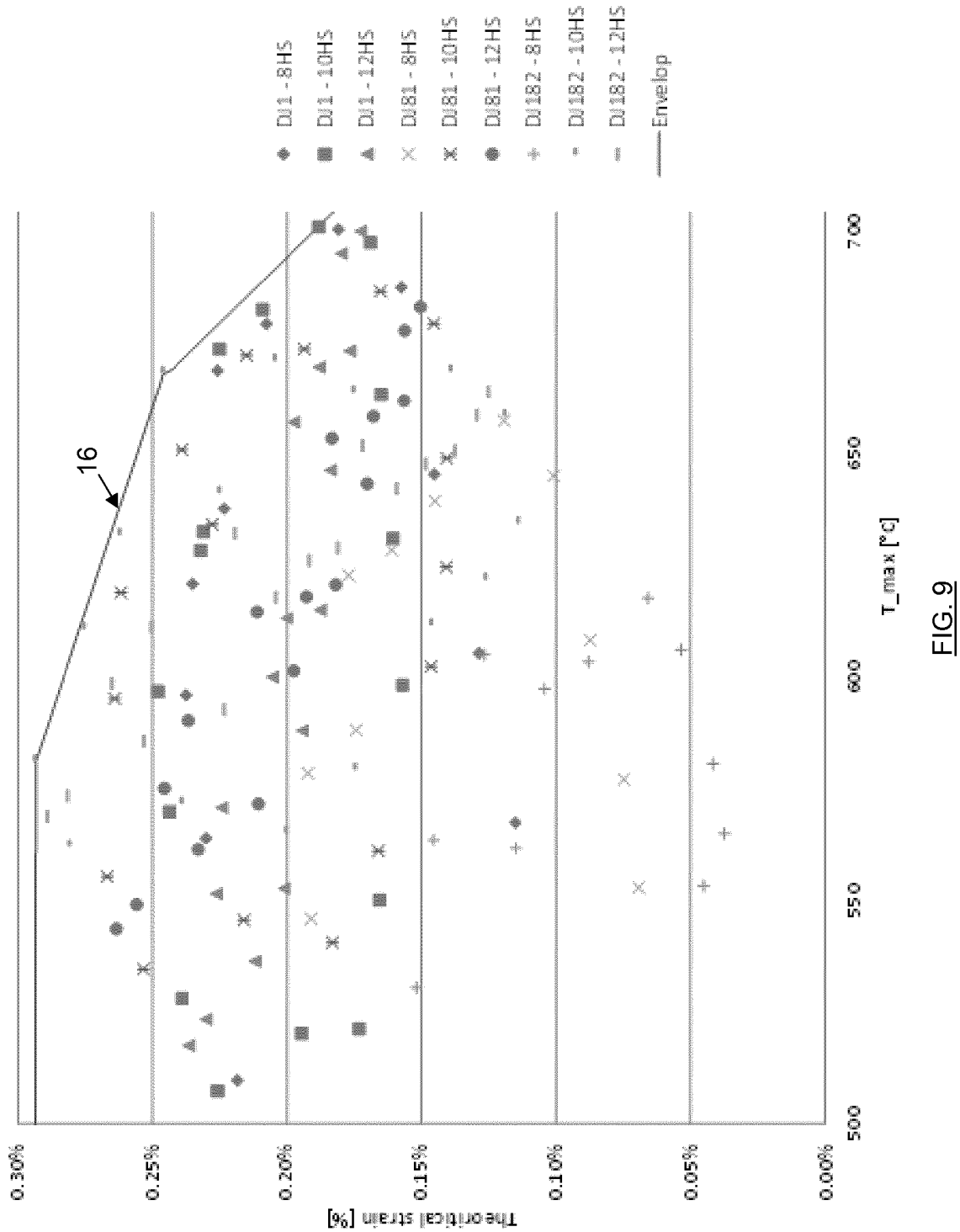
FIG. 9 represents the operating envelop identification in a plot showing theoretical alloy strain $\varepsilon_{alloy}$ as a function of $T_{o,max}$ for all the operating conditions defined by the customer.
Figure 10:
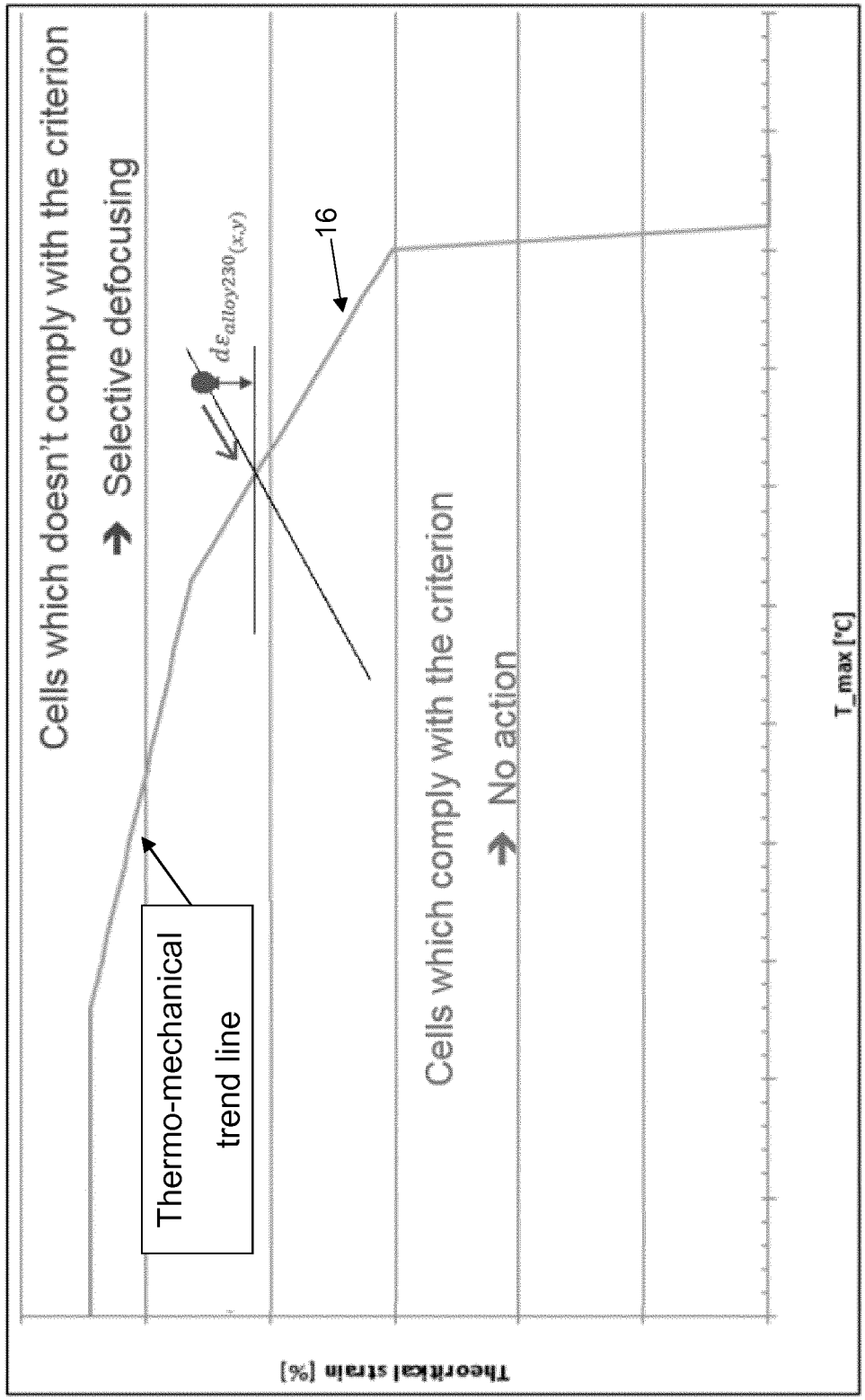
FIG. 10 shows the operating envelop of FIG. 9 with safe and unsafe area identification.

As the sole knowledge of the maximum temperature on the tube is not enough to ensure the integrity of the receiver, the applicant developed a mathematical model (so-called CMI software) able to calculate theoretical strain level in the tubes. The evaluation of both temperature and strain level in the tubes will allow ensuring the integrity of the receiver by comparison to the solar receiver operating envelope 16 that has been validated by a lifetime analysis of the tube under several thermo-mechanical loadings (fatigue-creep evaluation) (FIGS. 9 and 10). The operating envelope 16 (FIGS. 9 and 10) has thus been defined to cover all the operating points of the solar receiver.

Whenever the defined limits are exceeded, CMI software will generate an alarm and will require an area defocusing (FIG. 10) to the DCS 40 of the plant.

CMI software is therefore an add-in to IR supplier software which is installed on same master/slave computers, PC1 43 and PC2 44 respectively.

Figure 11:
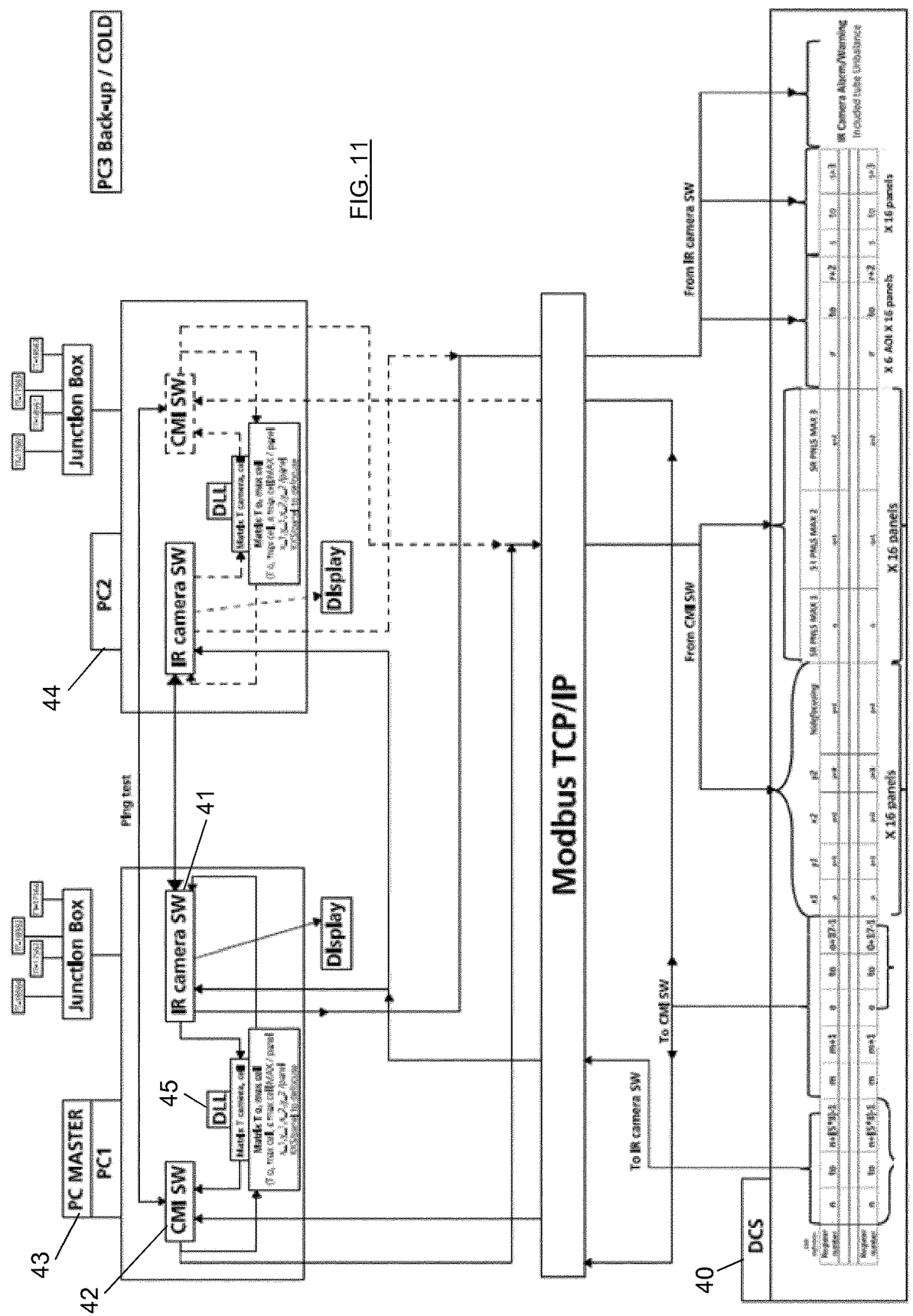
FIG. 11 represents the P&ID of the monitoring system.

6. DCS (Customer) or Distributed Control System of the Plant (FIG. 11)

In a DCS, a hierarchy of controllers is connected by communications networks for command and monitoring.

Two registers for storing for example a 4 bytes number are used (may be adapted depending on DCS data structure).

IR camera software needs address from DCS to get temperature measurement given by the thermocouples installed on the RAOI.

CMI software also needs address from DCS 40 to get inlet and outlet salt temperature for each panel. A number of registers are necessary respectively for the inlet and outlet salt temperature. Information in these registers is read from DCS 40 by the CMI software in PC1 43 and PC2 44. Moreover, CMI software needs mass flow measurement given by flow transmitters of the two solar receiver circuits to DCS 40.

CMI software also needs to be able to write defocus information in DCS registers such as the power decrease rate and the localization of the critical area.

CMI software also needs registers information of DCS 40 to be able to write therein the alarm status. Each of this information needs 1 bit (0 or 1) to be written in the registers.

In normal operation, CMI software in the PC master 43 (PC1) writes these data in the DCS 40 while the PC slave 44 is in standby. PC slave 44 will overtake PC master's role in case of failure of PC master 43 or failure of the IR software in the PC master 43 (FIG. 11).

IR supplier software needs register address of DCS to be able to write information such as the min/max/average temperature with its coordinates per AOI and the min/max temperature of all AOI per panel.

IR camera software from the PC master 43 writes the above data into and from the DCS 40 registers. If this PC fails, PC2 44 will write this data instead of PC1.

7. Computers PC1 and PC2 (FIG. 11)

These computers are necessary to post-treat and manage the data of the 8 IR cameras. Each PC 43, 44 respectively post-treats raw data of 4 cameras to ensure the redundancy.

IR camera post-treated data exchange, between PC1 43 and PC2 44, is only done through IR software of each PC. Both PC communicate data to each other from their 4 respective IR cameras.

CMI software is running on PC1 43 and PC2 44 individually and treats the data of the 8 IR cameras coming from the IR software through the DDL 45, respectively located in the same PC.

IR camera software and CMI software on PC1 (PC master 43) write and read information into and from DCS 40 respectively.

8. HTF Temperature Transmitters

Temperature transmitters are available for the 16 panels. At their inlet and outlets, for each measurement point, 3 thermocouples are available and the rule "2 out of 3" is applied, so ensuring a reliable temperature measurement of the heat transfer fluid (molten salt).

9. Flow Transmitters

Flow transmitters are available for the 2 circuits. Moreover a certain redundancy also exists thanks to the flow meter design that includes two pairs of ultrasonic probes (intrinsic redundancy).

Functional Aspects (Software)

To ensure the integrity of the molten salt solar receiver of a CSP tower plant, a thermo-mechanical monitoring method is proposed based on a mathematical model. The mathematical model is based on a thermal balance applied to a discretized tube.

Figure 12:
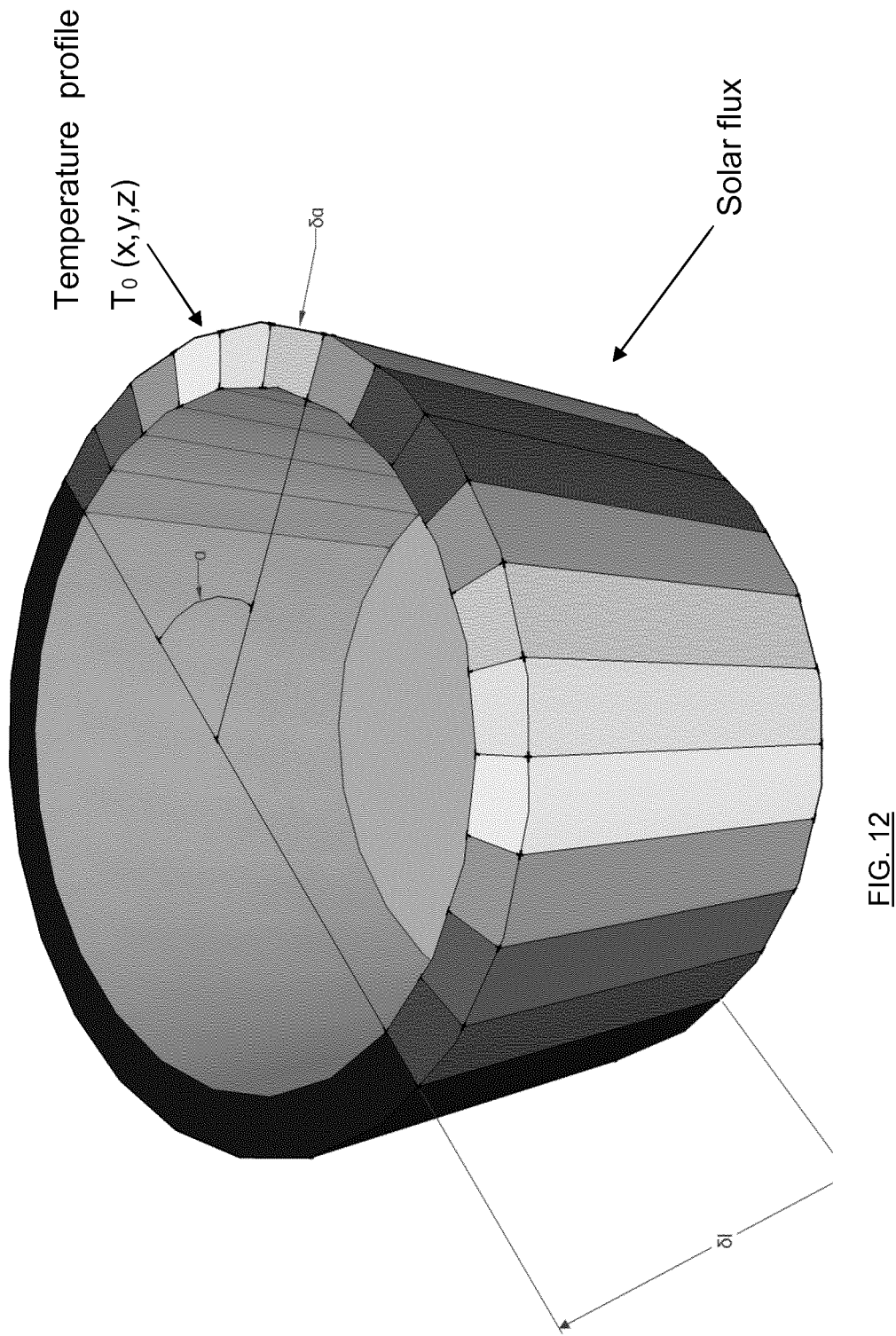
FIG. 12 represents an example of tube discretization.

A tube of the solar receiver panel is discretized. The position of these segments are identified by the angle α ranging from 0 to 180° (FIG. 12).

The thermal balance takes into consideration the following heat transfer and mode of transfers:
  the tube of the solar receiver panel receives the concentrated heat flux on 180° of its circumference,
  the conductivity through the tube thickness is taken into consideration,
  the forced convection is modelled by a heat transfer coefficient applied on the internal diameter of the discretized element of the tube;
  the different thermal losses on the external diameter are taken into consideration: reflectivity of the coating applied on the tube, emissivity, conductivity, forced and natural convection.

The thermal balance of the tube can be constructed and used according to a direct method or an indirect method. The direct method and indirect method mainly used the same classical thermal equations but not in the same order, and do not use the same inputs and do not generate the same outputs.

The classical thermal equations are based on the heat transfer theory and used also some empirical equation based on VDI Heat Atlas, Second Edition, Part G1, Section 4.1.

The originality of the software developed by the applicant is based on the possibility:
  to apply a correction on the measurement performed by the camera;
  to be able to evaluate the thermo-mechanical loading of each area of the solar receiver surface and compare it to the operating envelope of the solar receiver.

The two following sections will define more precisely the originality of the CMI software with the direct and indirect methods.

1. Direct Method of CMI Software

The direct method is mainly used to define and calculate:
  the solar receiver efficiency based on an incident flux map on the solar receiver surface;
  the corrective factors used in the indirect method: A and B coefficients (used for the IR camera thermomechanical monitoring)—see below.

The direct method is based on the following architecture and steps, depicted in Table 1, which is shown in FIG. 15.

In the direct method, the procedure is:
  to calculate/evaluate the external wall average temperature from the measurement done by the camera, using a simplified equation for the radiative transfer from the tube to the IR camera;
  to calculate A and B coefficients.

As it is shown in FIG. 5, each camera covers more than 90° of the solar receiver surface just in front of it. Based thereon and to ensure the redundancy:
Every Camera is Dedicated to Four Panels
  The calculation will be performed in parallel for two configurations:
    Configuration 1: panels 31 & 31';
    Configuration 2: panels 32 & 32'.
Every Panel is on the Field of View (FOV) of Two Cameras
  The obtained results depend on the following conditions:
    in normal conditions: results coming from a "configuration 1" calculation;
    in case of camera failure in normal conditions: results coming from a "configuration 2" calculation.

From the above-mentioned simplified equation, a value of $T_{camera,tube_{(x,y)}}$ on a tube can be evaluated using the discretization method. The equation takes into account $\alpha_1$, the angle between the panel plan and the tube tangent plan and $\alpha_2$, the angle between the camera axis and the straight line camera-tube axis. On should also notice that the camera is not "seeing" the entire surface of the half tube. Indeed, depending on the angles $\alpha_1$ and $\alpha_2$, some areas are hidden by the tube itself or by its neighbors and cannot be "seen" by the camera. This phenomenon is taken into account in the above-mentioned equation with the boundaries:

$\alpha_3$: angle in the shadow of neighbors tube;

$\alpha_4$: angle hidden by the tube itself.

Another important point to notice is that the camera temperatures have to be considered at the "cell level" or the discretization level as defined above (and not pixel level or tube level) and have to be representative of the radiative transfer from the tube to the IR camera taking into consideration the $T_{camera}$ at pixel level.

To simplify the relations, taking into consideration cell discretization, small variation of thermal flux from one cell to another one, and then from one tube to the others, and both configurations (see FIG. 5), the temperature of the tube is considered in temperature integration on 10×10 pixels, which will be considered as representative of one cell of 200×200 mm² for the two configurations.

So we can define $T_{camera}$ at cell level that respects the global power balance between the cell and the camera. $T_{camera}$ at cell level can be evaluated using the same discretization method as previously but integrated at the cell level and taking into consideration the $T_{camera}$ at pixel level coming directly from the camera.

Finally, in the (x, y) axes, the above-mentioned relation can be written at the cell level:

$$T_{camera,cell(x,y)} = \left[ \frac{\sum_{i=1}^{10} \sum_{j=1}^{10} (T_{camera,pixel\_i,j})^4}{10 \times 10} \right]^{1/4}$$

where, $T_{camera,pixel\_i,j}$ are the pixel temperatures in the considered cell.

As far as evaluation of A and B coefficients is considered, a linear least squares method is used on the temperature values found with the direct method:

DIRECT METHOD →

$$\begin{cases} T_{salt(x,y)} \\ T_{o,max(x,y)} \\ T_{camera(x,y)} \end{cases} \rightarrow \text{LINEAR LEAST SQUARES METHOD} \rightarrow A \ \&$$

B coefficients

The maximum external wall temperature of the tube is a very important parameter in order to perform thermo-mechanical monitoring and can be evaluated using A and B coefficients coming from the direct method (see above):

$T_{o,max(x,y)} = A \cdot T_{camera,cell(x,y)} + B \cdot T_{salt(x,y)}$

The external wall temperature on a half tube exposed to the normal solar flux are following a sinusoidal profile with a maximum on the tube crest:

$T_{o(x,y,90)} = T_{o,max(x,y)}$

2. Indirect Method of CMI Software

Based on the camera temperature map, the panel in/out salt temperatures, the salt mass flow, A and B coefficients, and the operating envelop, indirect method is used to ensure the thermomechanical monitoring by calculating:

the maximum temperature on each cell, the strain level on each cell, and to compare maximum temperature and strain to the operating envelop.

To be able to make this comparison, the following parameters have to be calculated:

inside heat transfer coefficients to comply with salt temperatures of each panel, absorbed flux map.

The indirect method used in the CMI software is based on the architecture and steps depicted in Table 2, which is shown in FIG. 16.

Step 5 is calculated, cell by cell, several times until convergence of absorbed power. Then, based on this power value, the direct method (step 6) can be used.

When a panel (19×92 cells) has been calculated, its outlet average salt temperature is compared to the process value coming from the DCS. If the values do not match, the calculation is performed again for each cell of this panel with a corrected value of inside heat transfer coefficient, a corrective factor being applied.

The next points define more precisely some steps of the indirect method described previously:

Camera Temperature Map at all Level

Figure 13:
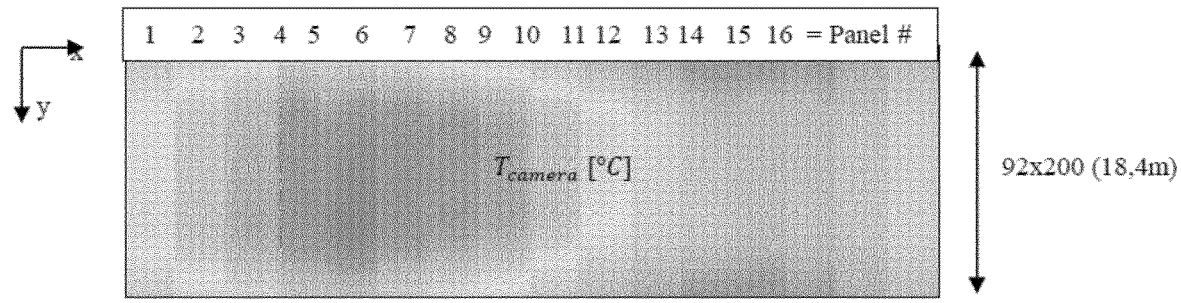
FIG. 13 represents an example of input camera temperature map.
Figure 14:
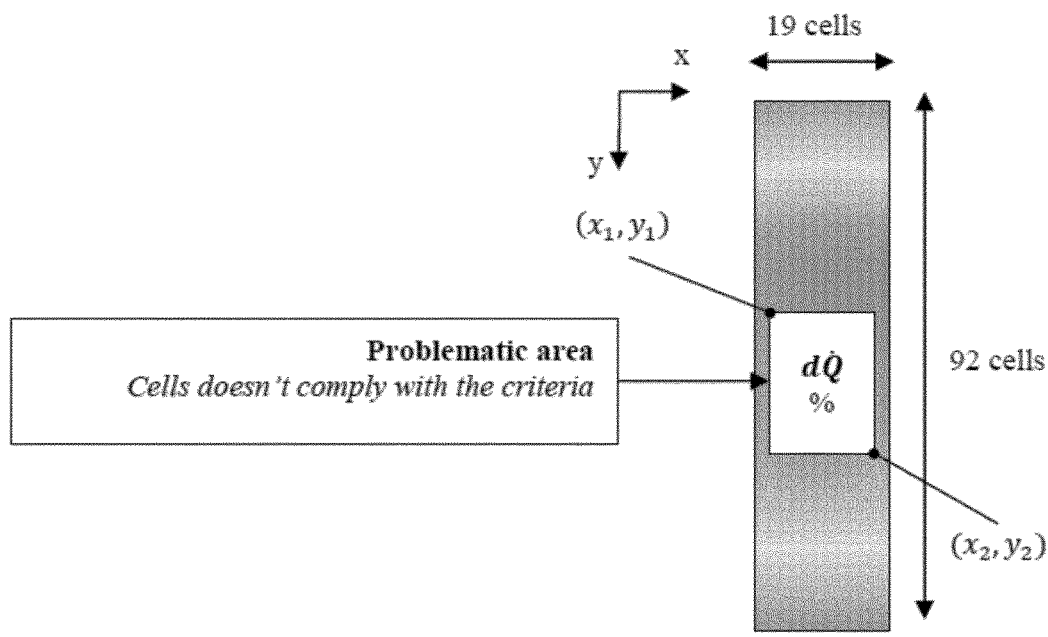
FIG. 14 represents an example of panel defocusing area.

The camera temperature map (FIG. 13) has the same characteristics as the incident flux map used for the direct method. It shows the temperature $T_{camera,cell}$ [° C.] on the cells of the solar receiver (19×92 cells by panel).

Guesses Values—Absorbed Power

For the first run, the power absorbed by the salt for each cell is defined as follow:

$$\dot{Q}_{salt(x,y)} = \frac{\dot{Q}_{salt,panel}}{n_{cell,panel}} = \frac{\dot{M}_{salt,circuit} \cdot (h_{salt,out_{panel}} - h_{salt,in_{panel}})}{19 \times 92}$$

The enthalpies are calculated in accordance with the process values coming from the DCS.

Maximal External Wall Temperature (See Direct Method)

Classical Thermal Equations

The classical thermal equations based on the heat transfer theory and also some empirical equation based on VDI Heat Atlas, Second Edition, Part G1, Section 4.1. are used to calculate:

absorbed power on the tube crest;

maximal internal wall temperature;

absorbed power by the cell;

inside heat transfer coefficient.

The inside heat transfer coefficient is calculated according to the direct method. However, if the result obtained does not match with the reality, this inside heat transfer coefficient has to be corrected. Therefore, the inside heat transfer is defined by the following modified equation:

$$h_{i(x,y)} = \frac{Nu_{salt(x,y)} \cdot \lambda_{salt(x,y)}}{d_i} \cdot f_{h_i}$$

where, $f_{h_i}$ Inside heat transfer coefficient correction factor (one per panel).

This correction factor is updated at the end of each panel calculation. The same correction factor is used for every cells of one panel.

Direct Method Based on the Absorbed Power

Once the power absorbed has been evaluated, the direct method can be used.

Theoretical Strain Vs. Temperature Envelop

The theoretical strain associated to the maximum wall external temperature is calculated to be compared to the validated envelop.

Once the external temperature profile is known around a representative half tube of the cell, the metal properties of the tube alloy (which can be for example a nickel-based or a stainless steel alloy) can be evaluated and the theoretical strain on the cell is calculated. The calculation applies to different operating flux maps gives the chart of FIG. 9. One critical point ($\varepsilon_{alloy,max}|T_{o,max}$) per panel is calculated for each flux map (9×16 points in total). The maximum external wall temperature and the theoretical strain of each panel is used to plot every point (1 per panel×16 panels×9 flux maps) of FIG. 9.

A dedicated study based on a lifetime evaluation has been performed to validate the envelop identified on FIG. 10, defined as the operating envelop of the solar receiver.

Every cell needs to comply with the following criterion evaluated at $T_{o,max_{(x,y)}}$:

$$\varepsilon_{alloy_{(x,y)}} \le \varepsilon_{alloy_{envelop}}.$$

If one or more cells do not comply with that criterion, the information is sent to DCS to perform selective defocusing. The $d\varepsilon_{alloy}$230 is defined in accordance with the representation presented on FIG. 10.

$$d\varepsilon_{alloy} = \varepsilon_{alloy_{(x,y)}} - \varepsilon_{alloy_{envelop}}$$

It can be determined by calculating the intersection between the thermo-mechanical trend line and the operation envelop (see FIG. 10).

The thermo-mechanical trend line is given by:

$$\varepsilon_{alloy_{(x,y)}} = f(T_{o,max_{(x,y)}}, T_{i,max_{(x,y)}}, T_{salt_{(x,y)}}) \cong C_1 \cdot \Delta T_{(x,y)}$$
$$= C_1 \cdot T_{o,max_{(x,y)}} - C_1 \cdot T_{salt_{(x,y)}}$$

while the operation envelop is given by:

$$\varepsilon_{alloy_{envelop}} = a \cdot T_{o,max_{(x,y)}} - b.$$

Power Decrease Rate

A correlation between the theoretical strength decrease and the power variation has be found to evaluate the power decrease rate.

One can show that the power decrease on tube crest for one cell is a function of the theoretical strength variation, of the form given below:

$$d\dot{Q}_{salt_{(x,y)}} = 2 \cdot n_{tube,cell} \cdot \frac{d\varepsilon_{alloy_{(x,y)}}}{1,150 \cdot 10^{-5}} \cdot \frac{\delta_l}{\Lambda_{(x,y)} + H_{i_{(x,y)}}}.$$

Criteria and Defocusing Request to the DCS

Local defocusing signal is generated by CMI software when limits in terms of maximum temperature and strain inside the tubes are exceeded in comparison to the operating envelope. An alarm is generated as well.

According to a preferred embodiment, criteria on strain $\Delta\varepsilon$ are defined in accordance with an order of magnitude related to the measurement uncertainaly:

Max: 0.025%;
Average: 0.017%

The percentage of defocusing given by CMI software to DCS will trigger one of three alarms based on the following conditions:

1) SR PANEL MAX 1: $\varepsilon_1$=Nominal envelope+0.015%; $t_1$>15 sec
   →Alarm to DCS;
2) SR PANEL MAX 2: $\varepsilon_2$=Nominal envelope+0.03%; $t_1+t_2$>30 sec
   →Alarm to DCS;
3) SR PANEL MAX 3: $\varepsilon_3$=Nominal envelope+0.05%; $t_1+t_2+t_3$>45 sec
   →Alarm to DCS+shutdown request DCS.

The defocus is activated if $\Delta\varepsilon$>0.015%:
0%<$\Delta\varepsilon$<0.015%→No action;
0.015%<$\Delta\varepsilon$<0.03%→Alarm 1+Defocus;
0.030%<$\Delta\varepsilon$<0.05%→Alarm 2+Defocus;
$\Delta\varepsilon$>0.05%→Alarm 3+shutdown request DCS.

The information sent to DCS are the problematic area location and the incident power decrease rate:

Area location—two coordinates to define the floating border corners of the problematic area:
($x_1$, $y_1$) Top left corner;
($x_2$, $y_2$) Bottom right corner.

Power decrease rate:
Percentage value;
Maximum value of the problematic area.

Still in the frame of the present invention, IR cameras with higher resolution could be used. However, this solution is not recommended for the following reasons:
more complex design (cooling system integrated for sensitive area of the camera);
better adapted to laboratory application rather than to industrial design (lifetime impacted);
in terms of cost: at least 6 times more expensive than a camera with 1024×768 pixels.

Further Perspectives

A further perspective related to the present invention is to provide a simplified guarantee (for example for molten salt flow (kg/s) at 565° C.) and heliostat control optimization with a close-loop.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS

1. CSP tower plant
2. Absorber panel (thermal shield)
3. Solar receiver
4. Cold tank of molten salt
5. Hot tank of molten salt
6. Receiver tube
7. IR camera monitoring system
7A. adjacent IR camera monitoring system
7B. adjacent IR camera monitoring system
8. Securing and orienting IR camera device
9. Supporting system (mast)
10. Position adjustment system
11. Remote cabinet
12. Reference area of interest (RAOI)
13. Thermocouple
14. Tube absorbed power profile
15. Tube temperature profile
16. Operating envelope
20. PID
21. Pressure sensor
22. flowmeter
23. Temperature sensor
30. Receiver panel
31,31'. Panels corresponding to configuration 1 (one camera)
32, 32'. Panels corresponding to configuration 2 (one camera)
40. DCS
41. IR camera software
42. CMI software
43. PC master
44. PC slave
45. DLL

The invention claimed is:

1. A concentrated solar power (CSP) plant, comprising:
   a plurality of heliostats or a heliostat field;
   a substantially cylindrical solar energy receiver located atop a central tower and having an external surface covered with receiver panels and a heat shield adjacent the solar receiver, the heliostats being configured to reflect solar energy to the external surface of the receiver, each receiver panel comprising a plurality of heat exchanger tubes configured to transport a heat transfer fluid, which are partly exposed on the external surface of the receiver;
   a thermo-mechanical monitoring system configured to ensure integrity of the solar receiver panel tubes in operation, the thermomechanical monitoring system comprising at least:
      a plurality of thermal imaging devices located on ground and mounted each on a securing and orienting device, configured to measure infrared radiation emitted by the external surface of the receiver and to provide a panel temperature-dependent signal in an area of the external surface;
      for each thermal imaging device, a reference area of interest RAOI located on the heat shield arranged opposite its thermal imaging device and containing one or more temperature sensors configured to measure a reference temperature corresponding to the RAOI,
      one or more flowmeters configured to measure a flow rate of heat-transfer fluid in the heat exchanger tubes and temperature sensors arranged respectively at inlets and outlets of the exchanger tubes, the measurements provided by the flowmeters and the temperature sensors being intended for calculating an energy balance absorbed by the heat transfer fluid in the receiver as well as mechanical strains experienced by the exchanger tubes; and
      a data processing system configured to calculate and/or supply respectively a maximum temperature, a temperature profile, and/or an absorbed power profile in each heat exchanger tube and theoretical mechanical strains assigned to each heat exchanger tube as a function of a temperature provided by the imaging devices, taking into account a reference temperature of the RAOI and a temperature of the heat transfer fluid at the inlets and the outlets of the tubes, in order to control if an operating point of an area located on the solar receiver is within an operating envelope in a 2D-space theoretical strain/$T_{max}$ defining predefined temperature and strain thresholds and in order to emit alerts upon exceeding predefined temperature and strain thresholds, while being outside the envelope and further to require heliostat radiation defocusing on the area, the data processing system comprising first control means configured to control IR cameras, second control means configured to control panel tube integrity in operation, and a distributed control system DCS connected to the first and second control means, to flowmeters, tube temperature sensors, and RAOI reference temperature sensors, the DCS being configured to communicate the measured reference temperature of the RAOI to the first control means, the measured flow rate and inlet/outlet temperatures of the heat transfer fluid to the first control means and/or second control means, and the DCS being configured to receive from the second control means local panel defocusing information for defocusing heliostat radiation on one or more panels;
   wherein the second control means configured to control panel tube integrity in operation comprise means configured to communicate with the first means and for:
      calculating a corrected maximum temperature on each exchanger tube by introducing a mathematical correction based on temperatures measured by the IR camera, inlet and outlet panel molten salt temperatures, and molten salt flow in the considered panel;
      with a dedicated mathematical creep-fatigue model, calculating theoretical strain level in the tubes;
      comparing a positioning of points defined by the calculated corrected maximum temperature and the calculated strain level within allowed solar receiver operating envelope; and
      generating an alarm and, according to the actual error level, requesting heliostat defocusing and/or shutdown, when a positioning of the calculated corrected maximum temperature and/or the calculated strain level is outside the operating envelope.

2. The concentrated solar power (CSP) plant according to claim 1, wherein the heat transfer fluid comprises a molten salt.

3. The concentrated solar power (CSP) plant according to claim 1, wherein the thermal imaging devices comprise IR cameras provided with a dedicated lens, are at least four in number, and located on ground at a defined distance of a CSP tower foot and with regular angular spacing from each other around the CSP tower.

4. The concentrated solar power (CSP) plant according to claim 3, wherein, for redundancy, every panel is on a field of view of two cameras, each camera being configured to monitor four panels in case of failure of a closest camera, panels being immediately outside the adjacent panels.

5. The concentrated solar power (CSP) plant according to claim 4, wherein the four panels comprise adjacent panels.

6. The concentrated solar power (CSP) plant according to claim 3, wherein an angle between the area to monitor on the solar receiver and an axis of the camera lens is between 45° and 90°.

7. The concentrated solar power (CSP) plant according to claim 1, wherein the securing and orienting device of the thermal imaging devices comprises a thermal imaging device housing, a mast, a position adjustment system, a remote cabinet, and cooling/heating means configured to maintain the thermal imaging devices in a predefined range of temperature.

8. The concentrated solar power (CSP) plant according to claim 1, wherein the first control means configured to control IR cameras are configured for:
 detecting hotspots and releasing automatic alarms;
 recording, analyzing, and storing temperature measurements;
 providing a surface temperature display for an operator, including transforming a cylindrical image into a rectangular flat image; and
 comparing IR camera measurements with a reference temperature given by the sensors of an RAOI and based on a trend given by a temperature reference, for calibrating IR cameras by adjusting transmissivity and/or emissivity parameters.

9. The concentrated solar power (CSP) plant according to claim 1, wherein the first control means configured to control IR cameras and second control means configured to control panel integrity in operation are under a form of readable instructions stored in a memory of a PC master, the first control means and the second control means being configured to communicate through a DLL also stored in the PC master, and
 wherein the first control means configured to control IR cameras are also under the form of readable instructions stored in the memory of a PC slave.

10. The concentrated solar power (CSP) plant according to claim 9, wherein raw IR camera data are post-treated on the PC master and on the PC slave, and
 wherein post-treated data are exchanged between both PCs by the first control means, the second means treating the data of the IR cameras coming from the first means through the DLL.

11. The concentrated solar power (CSP) plant according to claim 1, wherein a maximum external wall temperature T0, max of a tube located in (x, y) is given by:

$$T_{o,max_{(x,y)}} = A \cdot T_{camera,cell_{(x,y)}} + B \cdot T_{salt_{(x,y)}},$$

with A and B being obtained by a linear least squares fit on the data $T_{salt}$, $T_{0,max}$ and $T_{camera}$, a cell comprising i×j pixels (I, j integers >0).

12. The concentrated solar power (CSP) plant according to claim 1, further comprising a close-loop control means configured to optimize operation of a system comprising a solar receiver, IR cameras, and a heliostat field.

13. A method of using the concentrated solar power (CSP) plant according to claim 1, comprising:
 optimizing solar power received by the solar receiver and/or the used solar receiver surface.

14. A method for thermo-mechanically monitoring the solar energy receiver of the concentrated solar power (CSP) plant according to claim 1, in order to ensure integrity of the solar receiver panel tubes and/or to optimize power loading of the solar receiver, comprising at least the following steps:
 acquiring raw data from thermal imaging devices;
 correcting the raw data by reference temperatures of RAOI located on the thermal shield to get corrected temperatures at pixel level;
 acquiring molten salt mass flow data and molten salt temperatures at an inlet and an outlet of each receiver panel;
 guessing absorbed power;
 discretizing solar receiver in cells (x, y);
 at a cell level, calculating a maximum external temperature on a tube crest of exchanger tubes for a 90° angle line of view direction according to $$T_{o,max_{(x,y)}} = A \cdot T_{camera,cell_{(x,y)}} + B \cdot T_{salt_{(x,y)}},$$

where A and B are coefficients are determined by least squares method;
 calculating a cell maximum internal temperature in each exchanger tube;
 calculating a absorbed power, maximum external, and internal temperature of each exchanger tube at any line of view angle;
 calculating a theoretical strain level in the tube;
 comparing an actual tube thermo-mechanical loading with an operating strain/temperature envelope; and
 if a positioning is outside the operating envelope, according to predefined criteria, giving an alert signal.

15. The method according to claim 14, further comprising calculating power decrease rate and requesting heliostat radiation defocusing.

16. The concentrated solar power (CSP) plant according to claim 1, wherein the substantially cylindrical solar energy receiver comprises a molten salt solar receiver (MSSR).

* * * * *